(12) United States Patent  
Watanabe et al.

(10) Patent No.: US 8,943,286 B1  
(45) Date of Patent: Jan. 27, 2015

(54) STORAGE SYSTEM

(71) Applicant: Hitachi, Ltd., Tokyo (JP)

(72) Inventors: Yutaka Watanabe, Tokyo (JP); Hideo Saito, Tokyo (JP); Tomohiro Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/330,182

(22) Filed: Jul. 14, 2014

Related U.S. Application Data

(63) Continuation of application No. PCT/JP2014/061151, filed on Apr. 21, 2014.

(51) Int. Cl.
*G06F 3/06* (2006.01)
*G06F 11/14* (2006.01)

(52) U.S. Cl.
CPC .............. *G06F 3/065* (2013.01); *G06F 3/0604* (2013.01); *G06F 3/0665* (2013.01); *G06F 3/0689* (2013.01); *G06F 11/1458* (2013.01); *G06F 2003/0692* (2013.01)
USPC ................... 711/162; 711/114; 711/E12.103

(58) Field of Classification Search
None
See application file for complete search history.

(56) References Cited

U.S. PATENT DOCUMENTS 8,335,899 B1 * 12/2012 Meiri et al. .................... 711/162
8,521,974 B2 * 8/2013 Musolff ......................... 711/162
2009/0259817 A1 * 10/2009 Sharma et al. ................ 711/162
2009/0271582 A1 10/2009 Ninose
2012/0030422 A1 * 2/2012 Elkington et al. ............ 711/113
2014/0108754 A1 * 4/2014 Kawaguchi et al. .......... 711/162
2014/0122718 A1 * 5/2014 Thoppai et al. .............. 709/225
2014/0136776 A1 * 5/2014 Elkington et al. ............ 711/113

FOREIGN PATENT DOCUMENTS

| JP | 2005196490 | 7/2005 |
| JP | 2007058611 | 3/2007 |
| JP | 2007066154 | 3/2007 |
| JP | 2009211401 | 9/2009 |

OTHER PUBLICATIONS

Decision to Grant a Patent in JP Application No. 2014-530038, dated Aug. 26, 2014.

* cited by examiner

*Primary Examiner* — Edward Dudek, Jr.
*Assistant Examiner* — Ralph A Verderamo, III
(74) *Attorney, Agent, or Firm* — Mattingly & Malur, PC

(57) ABSTRACT

A storage system includes a first storage apparatus including a first logical volume and a second storage apparatus including a second logical volume. The first and second logical volumes are set as a High Availability pair and associated with a virtual volume. When receiving a write request to the virtual volume, the storage system manages storage area in the first logical volume regarding to the write request as storage area during data duplication, writes data in duplicate, in order from the first logical volume to the second logical volume. When receiving a read request to the virtual volume, the first storage apparatus waits for completion of the data duplication and reads data from the first logical volume if the storage area is during the data duplication, and the first storage apparatus reads data from the first logical volume if the storage area is not during the data duplication.

14 Claims, 23 Drawing Sheets

| VOL MAPPING INFORMATION MANAGEMENT TABLE 210 | | | |
|---|---|---|---|
| 211 | 212 | 213 | 214 |
| VOL ID | V_VOL ID | V_S/N | HA FLAG |
| 10:00 | 20:00 | XXX | ON |
| 10:01 | 20:01 | XXX | ON |
| 10:02 | 20:02 | XXX | OFF |

Fig. 7

| HA VOLUME PAIR MANAGEMENT TABLE 220 | | | | | |
|---|---|---|---|---|---|
| 221 | 222 | 223 | 224 | 225 | 226 |
| PAIR ID | PAIR STATUS | PVOL ID | MDKC S/N | SVOL ID | RDKC S/N |
| 0 | PAIR | 10:00 | AAA | 30:00 | BBB |
| 1 | PAIR | 10:01 | BBB | 30:01 | AAA |
| : | : | : | : | : | : |

Fig. 8

| LU PATH MANAGEMENT TABLE 230 | | |
|---|---|---|
| 231 | 232 | 233 |
| PORT ID | LUN | VOL ID |
| 0 | 0 | 10:00 |
|   | 1 | 10:01 |
|   | 2 | 10:02 |
| 1 | — | — |
| 2 | — | — |
| : | : | : |

Fig. 9

| VOL MANAGEMENT TABLE 240 | | |
|---|---|---|
| ~241 | ~242 | ~243 |
| VOL ID | SIZE | PG ID |
| 10:00 | 512GB | 0 |
| 10:01 | 512GB | 0 |
| 10:02 | 1TB | 1 |
| : | : | : |

Fig. 10

| PG MANAGEMENT TABLE 250 | | | |
|---|---|---|---|
| ~251 | ~252 | ~253 | ~254 |
| PG ID | PG TYPE | SIZE | RAID LEVEL |
| 0 | SAS | 1TB | RAID5 |
| 1 | SATA | 1TB | RAID6 |
| 2 | SSD | 512GB | RAID6 |
| : | : | : | : |

Fig. 11

| CACHE SLOT MANAGEMENT TABLE 270 | | | | | |
|---|---|---|---|---|---|
| ~271 | ~272 | ~273 | ~274 | ~275 | ~276 |
| SLOT# | PG ID | PG ADDRESS | VOL ID | VOL ADDRESS | SLOT STATUS |
| 0x00000000 | 0 | 0x00800000 | 40:00 | 0x00003000 | FREE |
| 0x00001000 | 0 | 0x00002000 | 40:00 | 0x10002000 | DIRTY |
| 0x00020000 | 0 | 0x00010000 | 10:00 | 0x70000000 | CLEAN |
| 0x00008000 | 1 | 0x20000000 | 10:01 | 0x00040000 | DUPLICATING |
| : | : | : | : | : | : |

Fig. 12

| JOB MANAGEMENT TABLE 260 | | | | | | | |
|---|---|---|---|---|---|---|---|
| 261 | 262 | 263 | 264 | 265 | 266 | 267 | 268 |
| JOB# | PROCESS TYPE | HA P/S | VOL ID | START LBA | LBA LENGTH | EXCLUSION TYPE | JOB#, MPPK# |
| 0 | HOST READ | PVOL | 10:00 | 0x00000000 | 0x00000200 | RD SHARED | — |
| 1 | HOST WRITE | PVOL | 40:00 | 0x00008000 | 0x00000100 | R/W EXCLUSIVE | — |
| 2 | INTER-DKC READ | PVOL | 50:00 | 0x40000000 | 0x00000100 | RD SHARED | — |
| 3 | INTER-DKC WRITE | PVOL | 60:00 | 0x80000000 | 0x00000080 | R/W EXCLUSIVE | — |
| 4 | HOST READ | SVOL | 70:01 | 0x00000200 | 0x00000200 | — | — |
| 5 | HOST WRITE | SVOL | 70:02 | 0x00001000 | 0x00000100 | — | 0, 12 |
| : | : | : | : | : | : | : | : |

Fig. 13

| VOL TYPE | PAIR STATUS | PROCESS | EXCLUSION TYPE |
|---|---|---|---|
| PVOL | PAIR | HOST READ | RD SHARED |
| | | HOST WRITE | R/W EXCLUSIVE |
| | | INTER-DKC WRITE | R/W EXCLUSIVE |
| | PSUS | HOST READ | RD SHARED |
| | | HOST WRITE | R/W EXCLUSIVE |
| | | INTER-DKC READ | RD SHARED |
| | | INTER-DKC WRITE | R/W EXCLUSIVE |
| SVOL | PAIR | HOST READ | — |
| | | HOST WRITE | — |
| | | INTER-DKC WRITE | — |

Fig. 22

STORAGE SYSTEM

CLAIM OF PRIORITY

The present application claims priority from PCT International Patent Application PCT/JP2014/061151 filed on Apr. 21, 2014, the content of which is hereby incorporated by reference into this application.

BACKGROUND

This invention relates to a storage system.

In recent years, information has been increasing in interest more and more because of, for example, generalization of big data analysis; disaster recovery for protecting important information has also been increasing in importance. In the disaster recovery technology, US 2009/0271582 A discloses a technique that, in normal operations, controls reads/writes from a host computer so as to access only a storage apparatus in a main site and copies data to a storage apparatus in a remote site, and upon occurrence of a failure in the main site, switches the accesses to the remote site.

SUMMARY

The increase in the amount of data is remarkable, like in the data for big data analysis; consequently, systems are growing in scale and complexity and increasing in number of apparatuses and cost for the backup site. Accordingly, desired is effective utilization of resources in the backup site. The technique disclosed in US 2009/0271582 A receives reads/writes only at the storage apparatus in the main site and does not allow accesses to the storage apparatus in the remote site in normal operations, failing in effective resource utilization.

In order to solve the problem, provided is a storage system including: a first storage apparatus, including a first logical volume, coupled to a host computer; and a second storage apparatus, including a second logical volume, coupled to the host computer and the first storage apparatus, wherein, when the first logical volume and the second logical volume are set as a High Availability pair in which data in the first logical volume is duplicated in the second logical volume, the storage system is configured to: associate an virtual identifier to both the first logical volume and the second logical volume so that the whichever the first storage apparatus or the second storage apparatus is capable to receive an access request to a virtual volume identified by the virtual identifier, wherein, when either the first storage apparatus or the second storage apparatus receives a write request to the virtual volume from the host computer, the storage system is configured to: manage storage area in the first logical volume regarding to the write request as storage area during data duplication; write data in duplicate, in order from the first logical volume to the second logical volume; and cancel the management of data duplication after writing data in both the first logical volume and the second logical volume; wherein, when the first storage apparatus receives a read request to the virtual volume from the host computer, the first storage apparatus is configured to: determine whether storage area regarding to the read request is during the data duplication; wait, if the storage area is during the data duplication, for completion of the data duplication, read data regarding to the read request from the first logical volume and return a response to the host computer; read, if the storage area is not during the data duplication, data regarding to the read request from the first logical volume, and return a response to the host computer, and wherein, when the second storage apparatus receives a read request to the virtual volume from the host computer, the second storage apparatus is configured to: read data regarding to the read request from the second logical volume without the determination of the data duplication; and return a response to the host computer.

According to an aspect of this invention, reads/writes can be received at storage apparatuses in a remote site; the resources in the remote site can be utilized effectively.

BRIEF DESCRIPTION OF THE DRAWINGS

FIG. 7 illustrates a configuration example of a VOL mapping information management table;

FIG. 8 illustrates a configuration example of an HA volume pair management table;

FIG. 9 illustrates a configuration example of an LU path management table;

FIG. 10 illustrates a configuration example of a VOL management table;

FIG. 11 illustrates a configuration example of a PG management table;

FIG. 12 illustrates a configuration example of a cache slot management table;

FIG. 13 illustrates a configuration example of a job management table;

FIG. 22 illustrates relations between pair statuses of an HA volume pair and exclusion types in I/O accesses to the PVOL and the SVOL;

DETAILED DESCRIPTION OF THE EMBODIMENTS

Hereinafter, embodiments of this invention are described with reference to the accompanying drawings. It should be noted that the embodiments are merely examples for implementing this invention and do not limit the technical scope of this invention. Throughout the drawings, common elements are assigned the same reference signs.

Figure 1A:
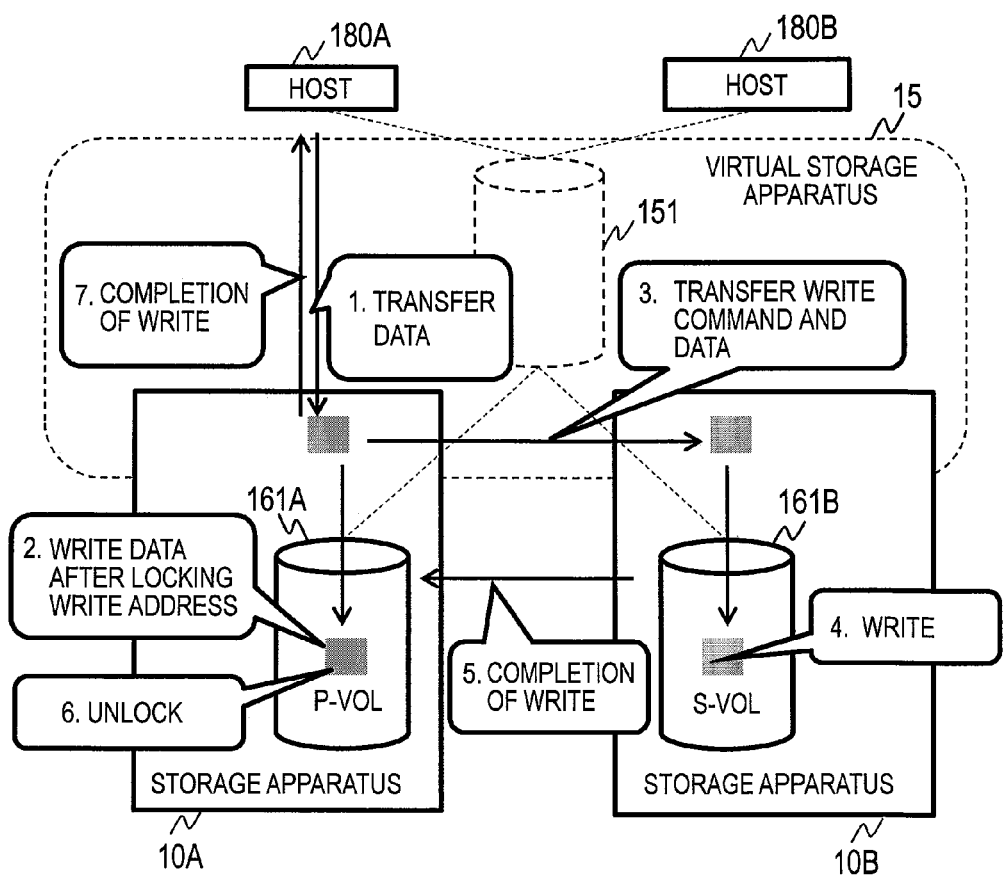
FIG. 1A illustrates an outline of processing flow in the case where a write instruction is directed to a PVOL.
Figure 1B:
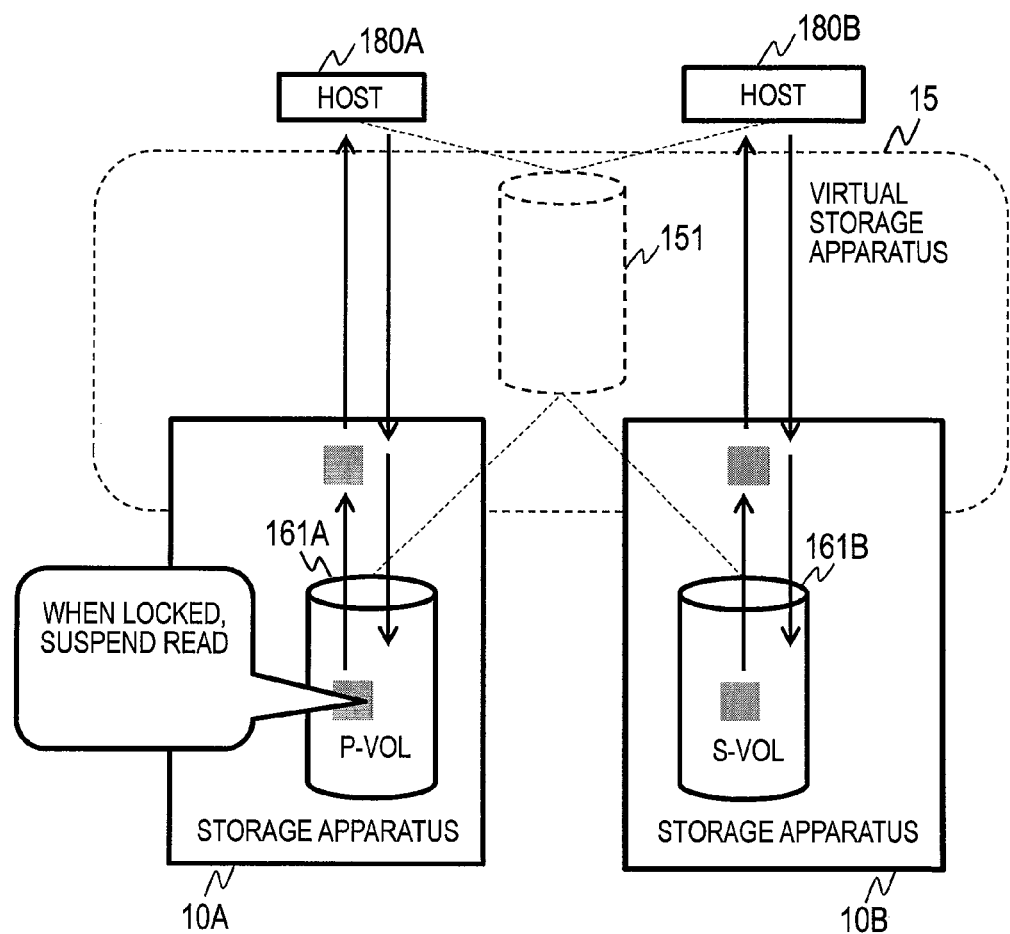
FIG. 1B illustrates outlines of processing flows in the cases where a read instruction is directed to a PVOL and an SVOL.

FIGS. 1A and 1B are diagrams illustrating an overview of an embodiment. The configuration disclosed in FIGS. 1A and 1B includes a host computer 180A, a host computer 180B, a storage apparatus 10A, and a storage apparatus 10B; the storage apparatuses 10A and 10B provide a virtual storage apparatus 15 to the host computers 180A and 180B.

A volume 161A, which is a volume of the storage apparatus 10A, and a volume 161B, which is a volume of the storage apparatus 10B, store the same data and show the same ID to the hosts; they are regarded as a single virtual volume 151 of the virtual storage apparatus 15 to be provided to the hosts. In the following description, elements that are not specified with a term "virtual" are real elements unless otherwise specified.

The host computers 180A and 180B send read/write instructions for a single virtual volume 151; actually, the instructions could be directed to either of the volumes 161A and 161B. Such a pair of the volumes 161A and 161B is referred to as an active-active high availability (HA) volume pair or an HA pair; a configuration including an HA pair as shown in FIGS. 1A and 1B is called an HA configuration.

In the following description, the HA configuration and the HA pair mean an active-active HA configuration and an active-active HA pair, respectively. An HA pair consists of a primary volume (PVOL) and a secondary volume (SVOL); in this description, the volume 161A is a PVOL and the volume 161B is an SVOL. The storage apparatus 10A providing a PVOL is called a main disk controller (MDKC) and the storage apparatus 10B providing an SVOL is called a remote disk controller (RDKC).

It should be noted that one storage apparatus can include a PVOL and an SVOL of two different HA volume pairs. That is to say, one storage apparatus functions concurrently as an MDKC and an RDKC, depending on the volume type in the HA volume pair. Hereinafter, using FIGS. 1A and 1B, outlines of processing when a write instruction and a read instruction for a PVOL and an SVOL are issued from a host are described. Data write to a volume and data read from a volume mean a write to and a read from a cache or a storage drive.

FIG. 1A illustrates an outline of processing flow in the case where a write instruction of the host computer 180A is directed to a volume 161A of a PVOL.

I. The storage apparatus 10A receives data transferred with a write instruction of the host computer 180A. II. The storage apparatus 10A acquires exclusivity on the write address in the volume 161A and writes the data to the volume 161A. III. The storage apparatus 10A transfers the data with a write command to the storage apparatus 10B to store the data to the volume 161B of an SVOL.

IV. The storage apparatus 10B in receipt of the write command and the data stores the data to the volume 161B. V. The storage apparatus 10B sends a completion report of the write to the storage apparatus 10A. VI. The storage apparatus 10A cancels the exclusivity acquired at II. VII. The storage apparatus 10A sends a write completion report to the host computer 180A.

In this way, in the case of receipt of a write instruction for a PVOL, the MDKC acquires exclusivity on the write address range, writes to the PVOL, instructs the RDKC to write to the SVOL, cancels the exclusivity after completion of the write to the SVOL, and responds to the host. Although the details will be described later, in the case of receipt of the write instruction at the SVOL side, the MDKC acquires the exclusivity, writes to the PVOL first and the SVOL subsequently, and cancels the exclusivity to perform the write processing. Job exclusion control in write processing prohibits other write processing and read processing for the write area. Consequently, the consistency between the PVOL and the SVOL can be properly maintained.

FIG. 1B illustrates outlines of processing flows in the cases where the host computer 180A issues a read request for the volume 161A of a PVOL and the host computer 180B issues a read request for the volume 161B of an SVOL. Upon receipt of an I/O request, the storage apparatus 10B in receipt of the read request for the volume 161B reads data from the volume 161B and returns the data to the host computer 180B. In this case, there is no need of communication with the storage apparatus 10A.

The storage apparatus 10A in receipt of a read request for the volume 161A checks whether the data storage area designated by the read request of FIG. 1A has acquired exclusivity described with FIG. 1A and if the write address is not locked, reads the data from the volume 161A and returns the data to the host computer 180A.

If the write address is locked, the storage apparatus 10A waits for a predetermined time and checks again whether the write address is locked. In the case of a read for the volume 161A of a PVOL, there is no need of communication between the storage apparatuses 10A and 10B, either.

Although details of job exclusion control in read processing will be described later, the job exclusion control in read processing prohibits write processing for the area but does not need to prohibit other read processing for the area. Permitting read processing reduces the delay in the other command processing.

In recent years, the importance of disaster recovery has been increasing to take preventive measures against disasters such as an earthquake. The HA configuration achieves high availability of storage systems. The HA configuration has a duplicated system; it allows automatic removal of a failed system upon occurrence of a failure to continue the operation only with the normally working system. The active-active HA configuration with duplicated storage apparatuses has been increasingly demanded in view of the disaster recovery and effective utilization of the resources.

The active-active HA configuration uses all the systems as active systems. In the active-active HA configuration, the information system can accept I/O accesses to either of a volume pair from a host, achieving effective utilization of the resources such as the bandwidths of paths, processing capability of storage controllers, and processing capability of drives.

To accept I/O accesses to either of a volume pair, it is required to prevent reading of old data after reading new data in either case where a PVOL is accessed or an SVOL is accessed. This is because an unintentional rollback which reads data in reverse order may cause a malfunction in the host.

As an example to cope with this problem, this embodiment applies job exclusion control for PVOLs to I/O accesses to PVOLs and does not apply job exclusion control to I/O accesses to SVOLs. The job exclusion control for a PVOL can properly maintain the consistency between the PVOL and the SVOL with respect to a command from a host and further, omitting the exclusive control for the SVOL achieves efficient processing.

This embodiment is based on assumptions that the duplicated storage is installed in a different site in view of the disaster recovery and that the two sites are distant about 100 km. Accordingly, communications between the sites are delayed about 1 msec. For this reason, it is required to decrease communications between sites for I/O synchronization in responding to write and read commands. In host read processing in this embodiment, the MDKC or the RDKC returns data read from a PVOL or an SVOL without communication between the storage apparatuses. Since the communications between storage apparatuses are unnecessary, delay in processing a read command from a host can be prevented.

Furthermore, increase in data is propelling enlargement of the system scale as described above; demanded is implementation with fewer apparatuses to achieve lower cost for system construction and system management. This embodiment accomplishes an active-active HA configuration without special apparatuses such as an appliance.

Figure 2:
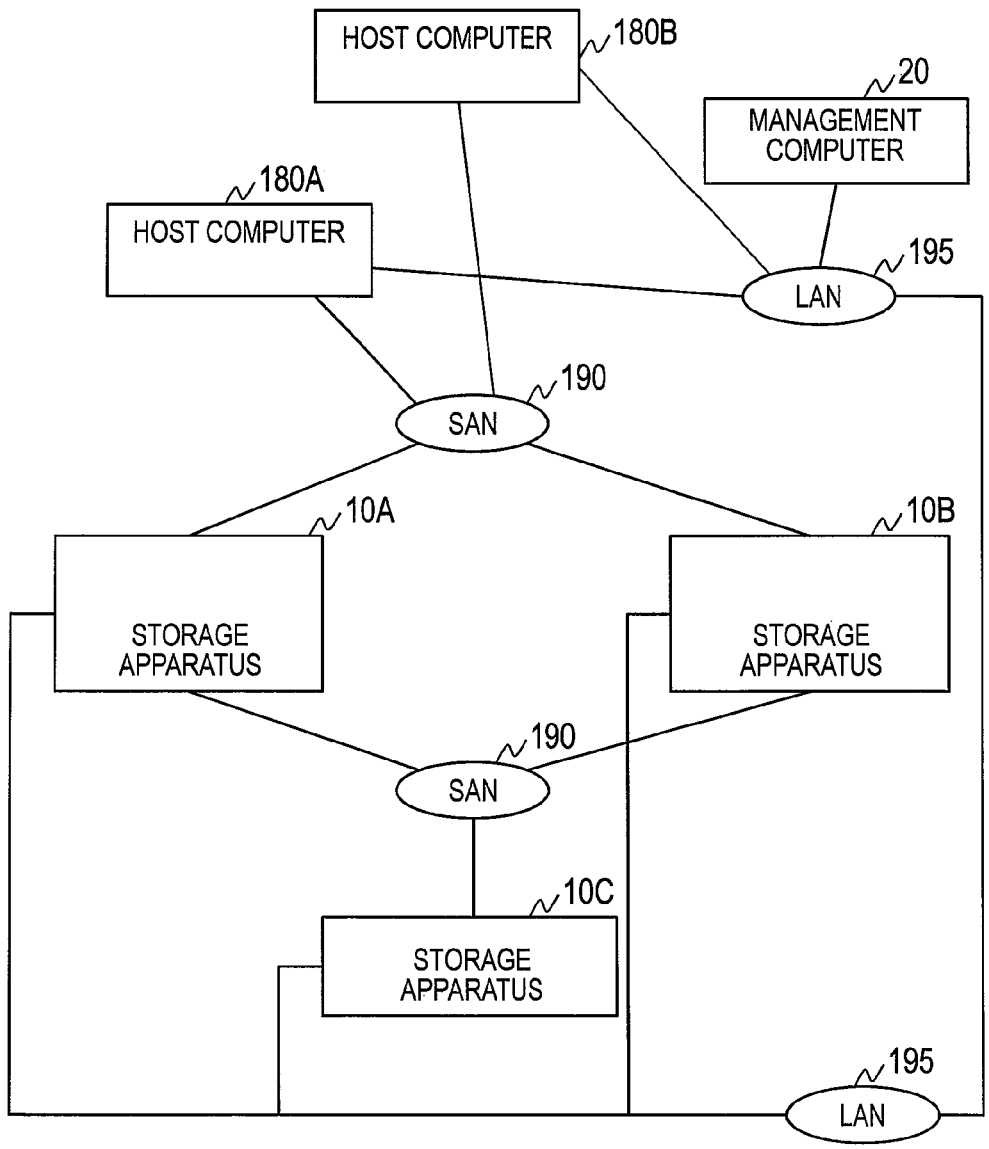
FIG. 2 illustrates a configuration example of a computer system in an embodiment.

FIG. 2 illustrates a configuration example of a computer system including the information system in this embodiment. The computer system of FIG. 2 includes host computers 180A and 180B, storage apparatuses 10A to 10C, and a management computer 20. The storage apparatuses 10A to 10C are included in the information system; the host computers 180A and 180B access the information system; and the management computer 20 manages the information system.

The number of each kind of apparatuses (systems) included in the computer system depend on the design. The storage apparatuses 10A and 10B constitute an active-active HA storage pair and provide a virtual storage apparatus. The storage apparatuses 10A and 10B behave as the same virtual storage apparatus for the host computers 180A and 180B. In the following example, the storage apparatuses 10A and 10B provide a single virtual storage apparatus.

The storage apparatus 10C has a quorum disk. The quorum disk provides a function to determine, when communications between the storage apparatuses 10A and 10B in the HA configuration is unavailable, the storage apparatus to keep working and the storage apparatus to stop working.

Specifically, each of the storage apparatuses 10A and 10B writes the conditions of the storage apparatus and the statuses of its communications with the other storage apparatus to the quorum disk. Each storage apparatus refers to the quorum disk periodically or synchronously with each I/O response and determines which storage apparatus is to keep working and to stop working based on the information written to the quorum disk.

The host computers 180A and 180B, the management computer 20, and the storage apparatuses 10A to 10C are interconnected to be able to communicate via a management network configured with a LAN 195. For example, the management network 195 is an IP network. The management network 195 may be any type of network as far as it is a network for a management data communication.

The host computers 180A and 180B and the storage apparatuses 10A to 10C are interconnected with a data network configured with a storage area network (SAN) 190. The host computers 180A and 180B access volumes in the storage apparatuses 10A and 10B via the SAN 190. The storage apparatuses 10A to 10C communicate with one another via the SAN 190.

The data network 190 may be any type of network as far as it is a network for data communication. The data network 190 and the management network 195 may be the same network.

Figure 3:
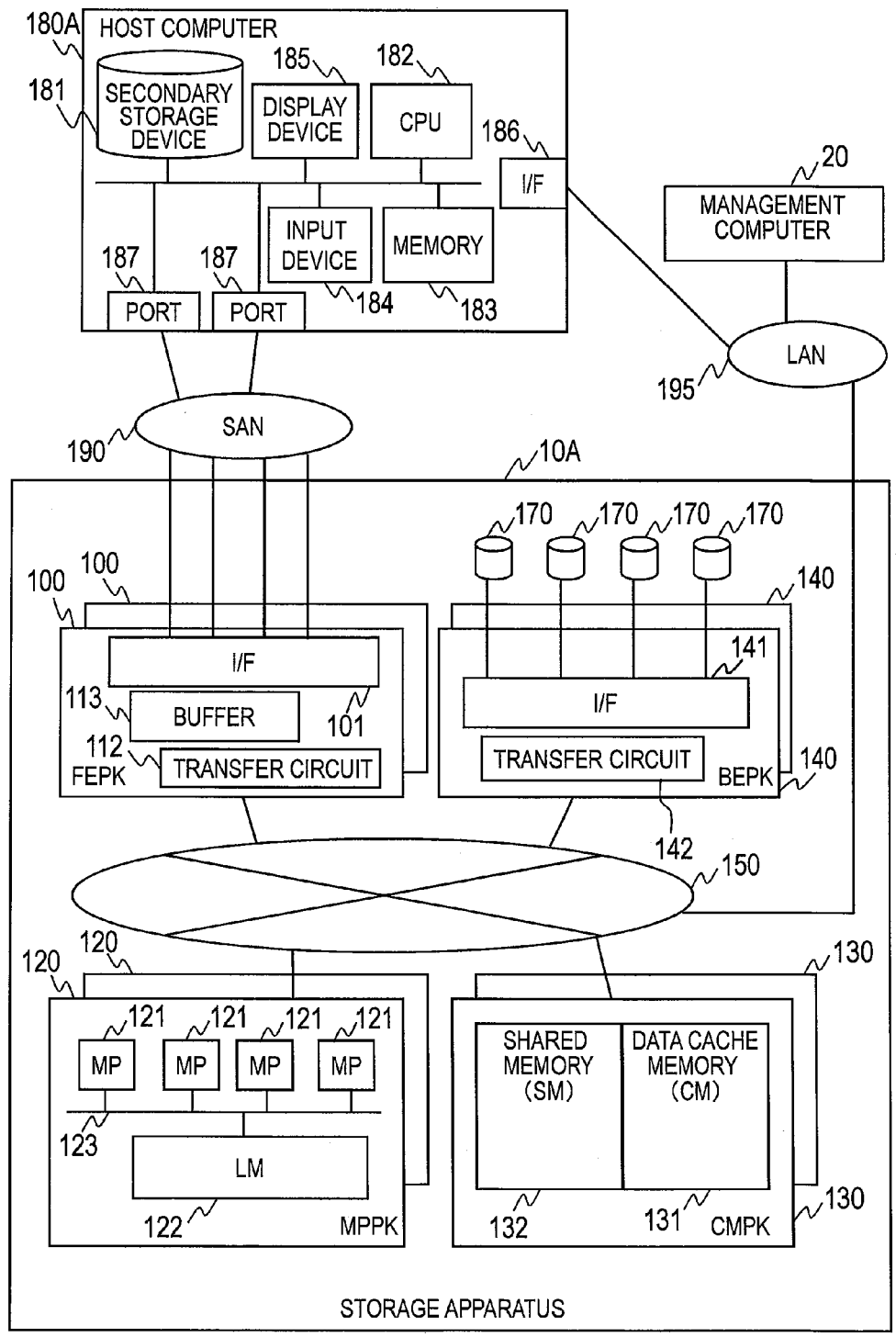
FIG. 3 schematically illustrates a hardware configuration example of a host computer and a storage apparatus.

FIG. 3 schematically illustrates a hardware configuration example of a host computer 180 and a storage apparatus 10. The host computer 180 and the storage apparatus 10 respectively represent any one of the host computers and any one of the storage apparatuses in the computer system.

The host computer 180 includes a secondary storage device 181, a CPU 182 of a processor, a memory 183 of a primary storage device, an input device 184, a display device 185 of an output device, an I/F 186, and ports 187. These are interconnected via an internal network. The management computer 20 can have the same hardware configuration.

The CPU 182 executes programs stored in the memory 183 to perform a variety of processing. For example, the memory 183 retains an OS, a path switch program, and an application program. The application program reads and writes data from and to volumes provided by the storage apparatus 10. The path switch program selects a path to a real volume to be accessed among the paths allocated to a virtual volume.

The ports 187 are network interfaces to connect with the SAN 190. The ports 187 communicate data and requests with the storage apparatus 10 via the SAN 190. The interface 186 is a network interface to connect with the LAN 195. The interface 186 communicates management data and control commands with the management computer 20 and the physical storage apparatus 10 via the LAN 195.

The storage apparatus 10 accommodates a plurality of storage drives 170. The storage drives 170 are, for example, HDDs including non-volatile magnetic disks or SSDs including non-volatile semiconductor memories (such as flash memories). With these storage drives 170, volumes such as the volume 161 are configured.

Each storage drive 170 stores data (user data) sent from a host or other storage apparatus. A plurality of storage drives 170 provides redundancy of data through RAID computing to prevent data loss in the case of occurrence of a failure in one of the storage drives 170.

The storage apparatus 10 includes a front end package (FEPK) 100 for connecting with external apparatuses via the SAN 190. In the computer system of this example, the external apparatuses are hosts and storage apparatuses.

The storage apparatus 10 further includes a backend package (BEPK) 140 for connecting with storage drives 170, a cache memory package (CMPK) 130 mounting cache memories, a microprocessor package (MPPK) 120 mounting microprocessors for performing internal processing, and an internal network 150 connecting them.

The storage apparatus 10 in this example includes a plurality of FEPKs 100, a plurality of BEPKs 140, a plurality of CMPKs 130, and a plurality of MPPKs 120. The storage apparatus 10 may further include a management processor for functioning as an interface used in communications with the management computer 20.

Each FEPK 100 includes an interface 101 for connecting with external apparatuses and a transfer circuit 112 for transferring data within the storage apparatus 10 on a board. The interface 101 can include a plurality of ports; each port can connect with an external apparatus. The interface 101 converts a protocol used in data communications between an external apparatus and the storage apparatus 10, such as Fibre Channel over Ethernet (FCoE), into a protocol used for the internal network 150, such as PCI-Express. The FEPK 100 further includes a buffer 113. The buffer is an area for temporarily storing data received from the host computer 180A and is made of a storage medium such as a DRAM.

Each BEPK 140 includes an interface 141 for connecting with drives 170 and a transfer circuit 142 for transferring data within the storage apparatus 10 on a board. The interface 141 converts a protocol used in communications with the storage drives 170, such as FC, into a protocol used for the internal network 150.

Each CMPK 130 includes a cache memory (CM) 131 for temporarily storing user data and a shared memory (SM) 132 for storing control information handled by one or more MPPKs 120 on a board.

A plurality of MPPKs 120 (the microprocessors therein) assigned different volumes can access the shared memory 132. The data and programs handled by the MPPKs 120 are loaded from non-volatile memories (not shown) or storage drives 170 in the storage apparatus 10.

Each MPPK 120 includes one or more microprocessors 121, a local memory (LM) 122, and a bus 123 connecting them. The MPPK 120 in this example includes a plurality of microprocessors 121. The number of microprocessors 121 may be one. The local memory 122 stores programs to be executed by the microprocessors 121 and control information to be used by the microprocessors 121.

As described above, one shared memory 132 stores control information handled by a plurality of MPPKs 120. An MPPK 120 loads control information necessary for itself to its own local memory 122.

In this configuration example, each MPPK 120 (each microprocessor 121 therein) is assigned volumes provided by the storage apparatus 10 to the host computers 180A and 180B. The local memory 122 and the shared memory 132 allocated to the MPPK 120 store the control information on the volumes for which the MPPK 120 is assigned I/Os.

Figure 4:
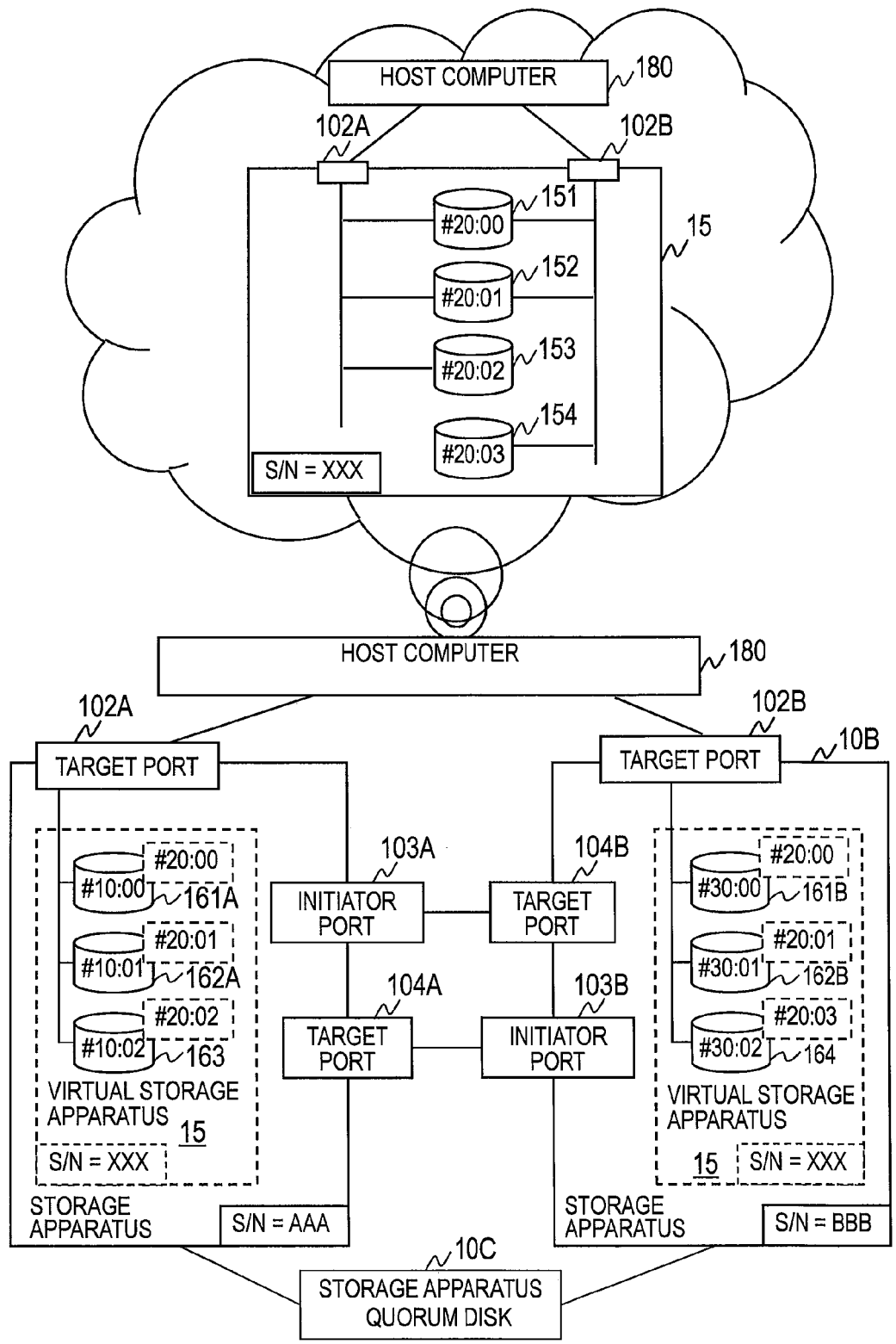
FIG. 4 illustrates an example of a virtual configuration provided by storage apparatuses to a host computer.

FIG. 4 illustrates an example of a virtual configuration provided by the storage apparatuses 10A and 10B to a host computer 180. The storage apparatuses 10A and 10B have target ports 102A and 102B, respectively. The target port 102A is assigned volumes 161A, 162A, and 163. The target port 102B is assigned volumes 161B, 162B, and 164.

The volumes may be so-called LDEVs which have the volume capacities equal to the actual sizes or thin provisioning volumes to which pages are allocated from a pool. All volumes may be configured with storage media included in not-shown other storage apparatuses. In this case, when a host computer accesses such a volume, the accessed storage apparatus communicates with the other storage apparatus including the storage medium and responds to the host computer.

The storage apparatuses 10A and 10B provide a virtual storage apparatus 15 to the host computer 180. For the host computer 180, the serial number (S/N) of the virtual storage apparatus 15 is XXX. The storage apparatuses 10A and 10B have their own serial numbers AAA and BBB, respectively. The host computer 180 recognizes the virtual storage apparatus 15 as a storage apparatus having a serial number XXX including target ports 102A and 102B. Serial numbers are identifiers of storage apparatuses and virtual storage apparatuses.

The volumes 161A and 161B constitute an HA volume pair and serve as a single virtual volume 151. The IDs of the volumes 161A and 161B are 10:00 and 30:00, respectively. The ID of the virtual volume 151 is 20:00.

The volumes 162A and 162B constitute an HA volume pair and serve as a single virtual volume 152. The IDs of the volumes 162A and 162B are 10:01 and 30:01, respectively. The ID of the virtual volume 152 is 20:01.

The volumes 163 and 164 serve as virtual volumes 153 and 154, respectively. The IDs of the volumes 163 and 164 are 10:02 and 30:02, respectively. The IDs of the virtual volumes 153 and 154 are 20:02 and 20:03, respectively.

The host computer 180 recognizes that the virtual volumes 151 to 154 are provided by the virtual storage apparatus 15 and their IDs are 20:00 to 20:03. The host computer 180 can access the virtual volumes 151 and 152 via the either of the target ports 102A and 102B. The host computer 180 accesses the virtual volume 153 only via the target port 102A and accesses the virtual volume 154 only via the target port 102B.

Figure 5:
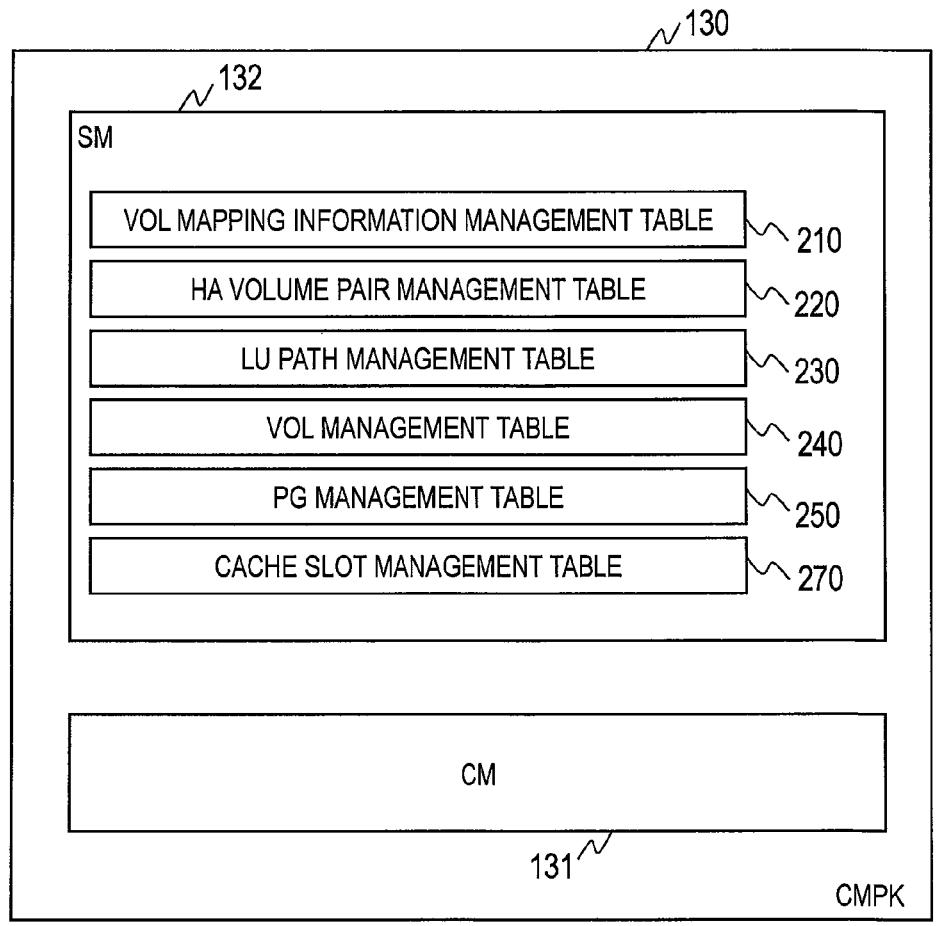
FIG. 5 illustrates information held in a shared memory in a CMPK of a storage apparatus.

FIG. 5 illustrates information held in the shared memory 132 in a CMPK 130 of a storage apparatus 10. The shared memory 132 holds a VOL mapping information management table 210, an HA volume pair management table 220, an LU path management table 230, a VOL management table 240, a PG management table 250, and a cache slot management table 270. The shared memory 132 can be accessed from a plurality of MPPKs 120.

Figure 6:
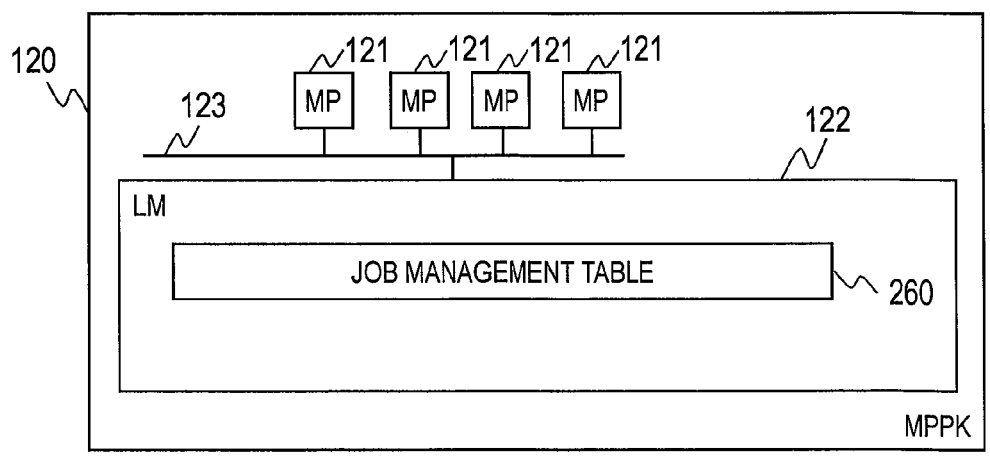
FIG. 6 illustrates information held in a local memory in an MPPK of a storage apparatus.

FIG. 6 illustrates information held in the local memory 122 in an MPPK 120 of a storage apparatus 10. The local memory 122 holds a job management table 260.

Hereinafter, configuration examples of the aforementioned tables will be described. The drawings referenced in the following description illustrate tables in the storage apparatus 10A. FIG. 7 illustrates a configuration example of the VOL mapping information management table 210. The VOL mapping information management table 210 associates real configuration information on the volumes included in the storage apparatus 10A with virtual configuration information on the same. Specifically, the VOL mapping information management table 210 includes a column 211 of volume IDs, a column 212 of virtual volume IDs, a column 213 of serial numbers (identifiers) of virtual storage apparatuses, and a column 214 of HA flags.

Each entry indicates an ID of a virtual volume associated with a volume, an ID of a virtual storage apparatus providing the virtual volume, and whether the volume is one of an HA volume pair. If the value of the column of HA flags is ON, the volume forms an HA volume pair with another volume.

FIG. 8 illustrates a configuration example of the HA volume pair management table 220. The HA volume pair management table 220 holds management information on HA volume pairs. Specifically, the HA volume pair management table 220 includes a column 221 of IDs of HA volume pairs, a column 222 indicating statuses of the HA volume pairs, a column 223 of IDs of the PVOLs of the HA volume pairs, and a column 224 storing identifiers of MDKCs providing the PVOLs.

The HA volume pair management table 220 further includes a column 225 of IDs of the SVOLs of the HA volume pairs and a column 226 storing identifiers of RDKCs providing the SVOLs. In each entry, the PVOL or SVOL is a volume provided by the storage apparatus 10A holding this table.

Examples of the pair status include COPY, PAIR, and SUSPEND. The status of COPY is a status in which data is being copied from one volume of an HA volume pair to the other. The status of PAIR is a status in which the two volumes of an HA volume pair are synchronized. The status of SUSPEND is a status in which the two volumes of an HA volume pair are not synchronized.

FIG. 9 illustrates a configuration example of the LU path management table 230. The LU path management table 230 manages ports and volumes associated with LUNs. Specifically, the LU path management table 230 includes a column 231 of port IDs, a column 232 of LUNs, and a column of 233 of volume IDs.

FIG. 10 illustrates a configuration example of the VOL management table 240. The VOL management table 240 holds characteristic information on volumes. Specifically, the VOL management table 240 includes a column 241 of volume IDs, a column 242 indicating sizes of the volumes, and a column 243 of parity groups (PGs) providing physical storage areas to the volumes. The parity group is also referred to as RAID group.

FIG. 11 illustrates a configuration example of the PG management table 250. The PG management table 250 manages characteristics of parity groups. Specifically, the PG group management table 250 includes a column 251 of IDs of parity groups, a column 252 indicating types of the parity groups, a column 253 indicating sizes of the parity groups, and a column 254 indicating RAID levels of the parity groups.

FIG. 12 illustrates a configuration example of the cache slot management table 270. The cache slot management table 270 manages cached data. Specifically, the cache slot management table 270 holds information on cache slots (also simply referred to as slots), which are management units of cache. Each slot has the same size; a slot number determines the cache address of the slot.

The slot number column 271 stores slot numbers. The PG ID column 272 and the PG address column 273 indicate IDs of the parity groups holding the data stored in the slots and the addresses of the data in the parity groups. The VOL ID column 274 and the VOL address column 275 indicate IDs of the volumes holding the data stored in the slots and addresses of the data in the volumes.

The slot status column 276 indicates statuses of the slots. The status of FREE means that the slot is free. Although this example manages free slots, it is not necessary to manage the remaining slots other than the slots in the other statuses as free slots. The status of DIRTY means that the data in the slot has not been written to a parity group; that is to say, the data in the slot is not identical to the data in the parity group.

The status of CLEAN for a PVOL is different from the status of CLEAN for an SVOL. The CLEAN for a PVOL means that the data in the slot has been written to the parity group and also has been written to the SVOL (a completion response from the RDKC has been received). That is to say, the data in the slot is identical to the data in the parity group. The status of CLEAN for an SVOL means that the data in the slot has been written to the parity group.

The status of DURING DUPLICATION is a status unique to PVOLs and means that the data in the slot has not been written to the SVOL (a completion response from the RDKC has not been received). That is to say, the data in the PVOL is not identical to the data in the SVOL.

FIG. 13 illustrates a configuration example of the job management table 260. The job management table 260 manages jobs executed by the MPPK 120 holding the table. Each job in this example is a process to write to a volume or a process to read from a volume. The job management table 260 holds information on the jobs being executed and jobs to be executed. The maximum number of entries of the job management table 260 is determined in advance.

The job number column 261 indicates identifiers of jobs. The process type column 262 indicates the type of processing to be performed in each job, specifically, one of the processing responsive to a read command from a host computer 180 (HOST READ), the processing responsive to a write command from a host computer 180 (HOST WRITE), the processing responsive to a read command from another storage apparatus (INTER-DKC READ), and the processing responsive to a write command from another storage apparatus (INTER-DKC WRITE).

The HA P/S column 263 indicates whether the target volume of each job is a volume of an HA volume pair, and if it is a volume of an HA volume pair, whether the volume is a PVOL or an SVOL.

The VOL ID column 264 indicates the ID of the target volume of each job. The START LBA column 265 and the LBA LENGTH column 266 indicate the start address and the data size (address length) of the volume for the data handled by each job.

The exclusion type column 267 indicates whether each job has acquired an exclusive lock and if an exclusive lock has been acquired, indicates the type of the exclusion. The exclusion type RD SHARED means to prohibit writing to the address area and permit reading from the area. The exclusion type R/W EXCLUSIVE means to prohibit both of writing to and reading from the address area.

The job number and MPPK number column 268 stores data in the entries indicating processes responsive to a write command for a write to an SVOL from a host computer 180. The job number and MPPK number column 268 stores information for identifying the job in the MDKC of the write to the paired PVOL. The job can be identified by a job number and a number of the MPPK (identifier of the MPPK) to execute the job. As will be described later, the job identification information is included in an exclusive lock release command from an RDKC to an MDKC.

Figure 14:
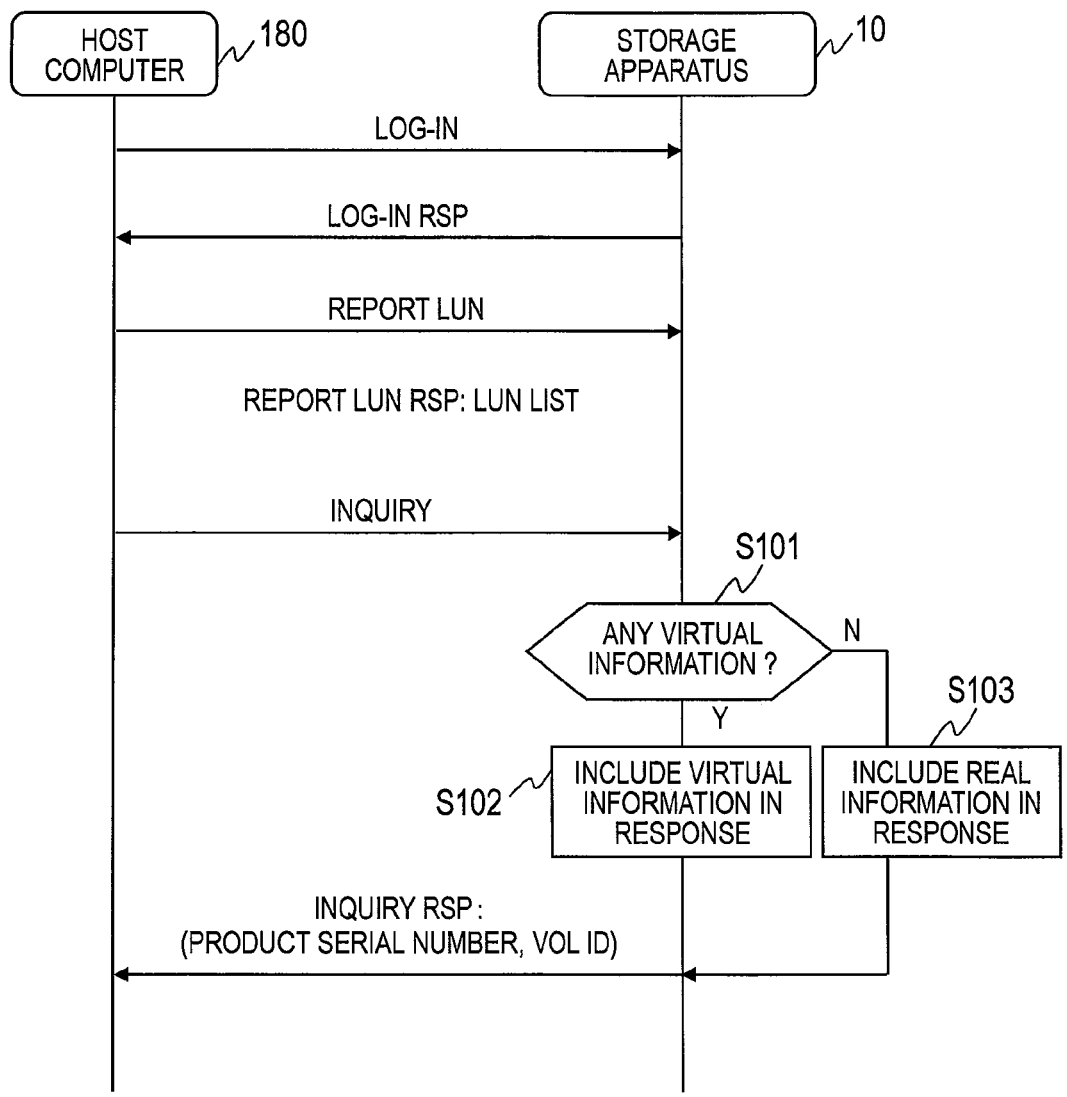
FIG. 14 illustrates a sequence of a method of providing information on a virtual storage apparatus and virtual volumes to a host computer.

The sequence diagram of FIG. 14 illustrates a method of providing information on the virtual storage apparatus 15 and the virtual volumes 151 to 154 to a host computer 180. The host computer 180 sends a log-in request to a storage apparatus 10, and after receipt of a response, sends a REPORT LUN command. The REPORT LUN command is to request for a list of logical unit numbers (LUNs) accessible from the port. The storage apparatus 10 refers to the LU path management table 230 and returns a list of accessible LUNs (REPORT LUN RSP).

The host computer 180 can inquire the serial number of the storage apparatus 10 and the IDs of the volumes associated with the LUNs using an INQUIRY command. The storage apparatus 10 determines whether corresponding virtual elements have been defined with reference to the LU path management table 230 and the VOL mapping information management table 210 (S101).

If corresponding virtual elements (virtual storage apparatuses or virtual volumes) have been defined (S101: Y), the storage apparatus 10 returns an INQUIRY response inclusive of information on the virtual elements (S102). If no corresponding virtual elements have been defined (S101: N), the storage apparatus 10 returns an INQUIRY response inclusive of information on the real elements (S103).

Taking an example of the configuration of FIG. 4, in the case where the host computer 180 requests the storage apparatus 10A (S/N: AAA) to send a notification of its serial number, the storage apparatus 10A in receipt of the request returns the serial number XXX of the virtual storage apparatus 15 to the host computer 180. The storage apparatus 10B also returns the serial number XXX of the virtual storage apparatus 15 to the host computer 180.

The serial number of the virtual storage apparatus 15 is common to the storage apparatuses 10A and 10B that constitute an HA storage apparatus pair. It makes the host computer 180 recognize the storage apparatuses 10A and 10B as a single virtual storage apparatus 15.

In similar, in the case where the host computer 180 requests the storage apparatus 10A to send a notification of volume IDs (VOL IDs) corresponding to the LUNs, the storage apparatus 10A sends the IDs (20:00 to 20:02) of the virtual volumes 151 to 153 to the host computer 180. Likewise, the storage apparatus 10B sends the IDs (20:00, 20:01, and 20:03) of the virtual volumes 151, 152, and 154 to the host computer 180.

In this way, the host computer 180 recognizes virtual volumes 151 to 154 and further, two paths (ports) for each of the virtual volumes 151 and 152 and one path (port) for each of the virtual volumes 153 and 154.

Creating an HA volume pair is described. The administrator creates an HA volume pair from volumes. The administrator instructs the storage apparatuses 10A and 10B to create an HA volume pair through the management computer 20.

One of the HA volume pair is defined as a PVOL and the other is defined as an SVOL. The administrator may define the PVOL and the SVOL through the management computer 20. As will be described later, processing accesses from the host computer 180 is different between the accesses to PVOLs and the accesses to SVOLs. Upon creation of an HA volume pair, the storage apparatuses 10A and 10B add a new entry to their HA volume pair management tables 220.

Furthermore, virtual information common to the HA volume pair is defined. The administrator of the storage apparatuses 10A and 10B defines a virtual volume ID common to the HA volume pair. The storage apparatuses 10A and 10B add a new entry including the defined virtual information to their VOL mapping information management tables 210.

Upon completion of defining the HA volume pair, the storage apparatuses 10A and 10B start initial data copy from the PVOL to the SVOL. Upon completion of the initial data copy, the two volumes have the identical data and synchronize with each other. That is to say, each of the storage apparatuses 10A and 10B receives a write command from the host computer 180, communicates the write command and the write data with the other, and updates its own PVOL or SVOL, maintaining the consistency between the volumes.

As will be described later, in response to a read command from the host computer 180, the storage apparatuses 10A and 10B return the data in their own volumes to the host computer 180 without communicating with the other storage apparatus, eliminating processing delay.

If one of the storage apparatuses 10A and 10B gets failed and cannot respond to an I/O access from the host computer 180, the other normally functioning storage apparatus that has detected the failure processes all I/O accesses from the host computer 180.

If a failure occurs in a volume of either one of the storage apparatuses but both of the storage apparatuses 10A and 10B can communicate with the host computer 180, the storage apparatus including the failed volume transfers commands from the host computer 180 to the other storage apparatus.

For example, it is assumed that a failure occurs in a volume of the storage apparatus 10B. The storage apparatus 10B transfers a write command from the host computer 180 to the storage apparatus 10A, and the storage apparatus 10A executes a write to its own volume. The storage apparatus 10B returns a write completion response to the host computer 180. The storage apparatus 10B also returns read data received from the storage apparatus 10A to the host computer 180. The same applies to the case where a failure occurs in a volume of the storage apparatus 10A, except that each action taken by the storage apparatus 10A or 10B is taken by the other storage apparatus.

In this way, this information system can provide high availability, and further, can define different roles for PVOLs and SVOLs in the case of a failure. For example, when a failure occurs in communications between the storage apparatuses 10A and 10B, the information system accepts I/O accesses from the host computer 180 to PVOLs and blocks I/O accesses to SVOLs. Through this operation, the data consistency in the virtual volume can be maintained.

The storage apparatuses 10A and 10B can know a failure in the other apparatus or communication between the storage apparatuses 10A and 10B through the quorum disk and the statuses of communications between the storage apparatuses 10A and 10B.

Figure 15:
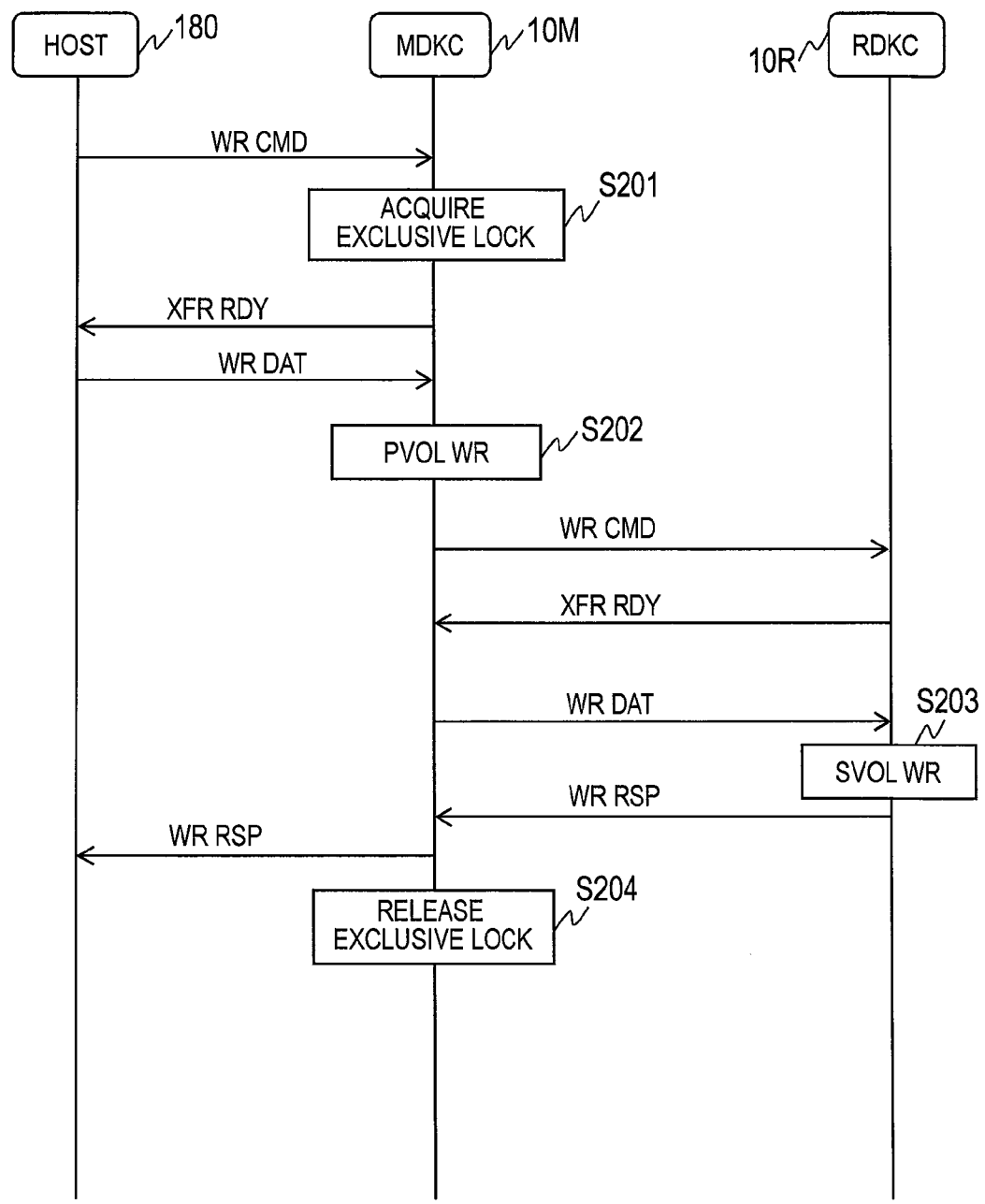
FIG. 15 illustrates a sequence of processing for a write from a host computer to a PVOL.

FIG. 15 illustrates a sequence of processing for a write from a host computer 180 to a PVOL. The host computer 180 issues a write command (WR CMD) for a write to an area in a virtual volume to the MDKC 10M. The MDKC 10M acquires an exclusive lock on the area designated by the write command in the PVOL corresponding to the virtual volume (S201).

When the MDKC 10M is ready to receive data, it returns a data transfer ready response (XFR RD) to the host computer 180 and receives write data (WR DAT) from the host computer 180. The MDKC 10M writes the received write data to the address area in the PVOL (S202). As described above, a write to a PVOL is a write to the cache memory 131 if the write cache function is ON, or a write to a parity group (physical storage area) if the write cache function is OFF.

The MDKC 10M sends the RDKC 10R a write command (WR CMD) for a write to an area in the SVOL paired with the PVOL to form an HA volume pair. The SVOL can be designated with a volume ID or a separately defined LUN. The RDKC 10R returns a data transfer ready response (XFR RD) to the MDKC 10M and receives write data (WR DAT) from the MDKC 10M. The RDKC 10R writes the received write data to the address area in the SVOL (S203). The write to the SVOL is the same as the above-described write to the PVOL.

Upon completion of data write to the address area in the SVOL, the RDKC 10R returns a write completion response (WR RSP) to the MDKC 10M. Upon receipt of the write completion response from the RDKC 10R, the MDKC 10M returns a write completion response (WR RSP) to the host computer 180. Furthermore, the MDKC 10M releases the acquired exclusive lock (S204).

Figure 16:
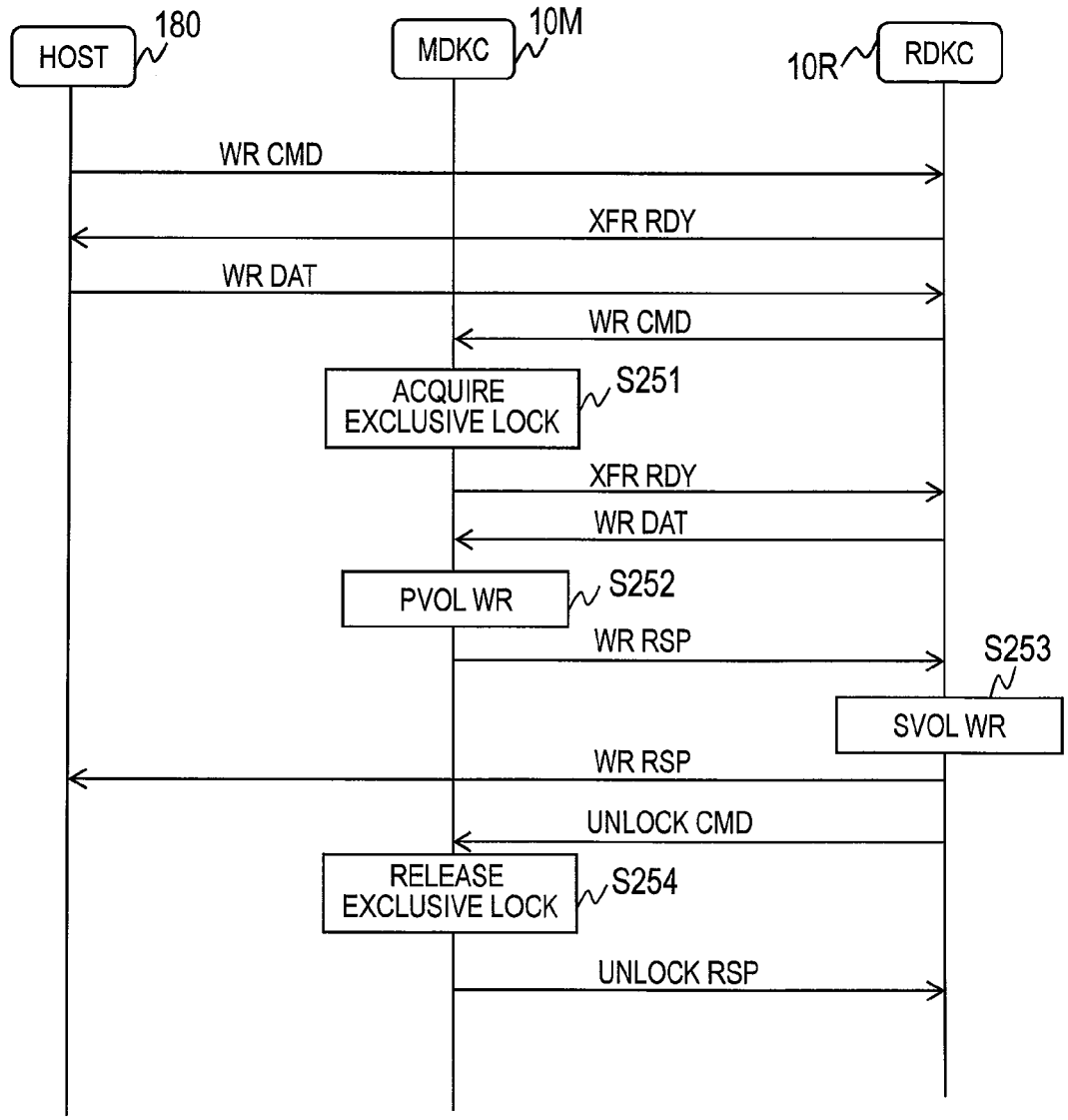
FIG. 16 illustrates a sequence of processing for a write from a host computer to an SVOL.

FIG. 16 illustrates a sequence of processing for a write from a host computer 180 to an SVOL. The host computer 180 issues a write command (WR CMD) for a write to an area in a virtual volume to the RDKC 10R.

When the RDKC 10R is ready to receive data, it returns a data transfer ready response (XFR RD) to the host computer 180 and receives write data (WR DAT) from the host computer 180. The RDKC 10R sends the MDKC 10M a write command (WR CMD) for a write to an area in the PVOL paired with the SVOL to form an HA volume pair.

The MDKC 10M acquires an exclusive lock on the area in the volume designated by the write command (S251). Thereafter, the MDKC 10M returns a data transfer ready response (XFR RD) to the RDKC 10R and receives the write data (WR DAT) from the RDKC 10R.

The MDKC 10M writes the received write data to the designated area in the PVOL (S252). Upon completion of the data write to the area in the PVOL, the MDKC 10M returns a write completion response (WR RSP) to the RDKC 10R.

Upon receipt of the write completion response from the MDKC 10M, the RDKC 10R writes the write data to the designated area in the SVOL (S253). The RDKC 10R returns a write completion response (WR RSP) to the host computer 180. Thereafter, the RDKC 10R sends an exclusive lock release command designating the job to the MDKC 10M. The MDKC 10M releases the acquired exclusive lock (S254) and returns a response indicating that the exclusive lock for the designated job has been released to the RDKC 10R.

Figure 17:
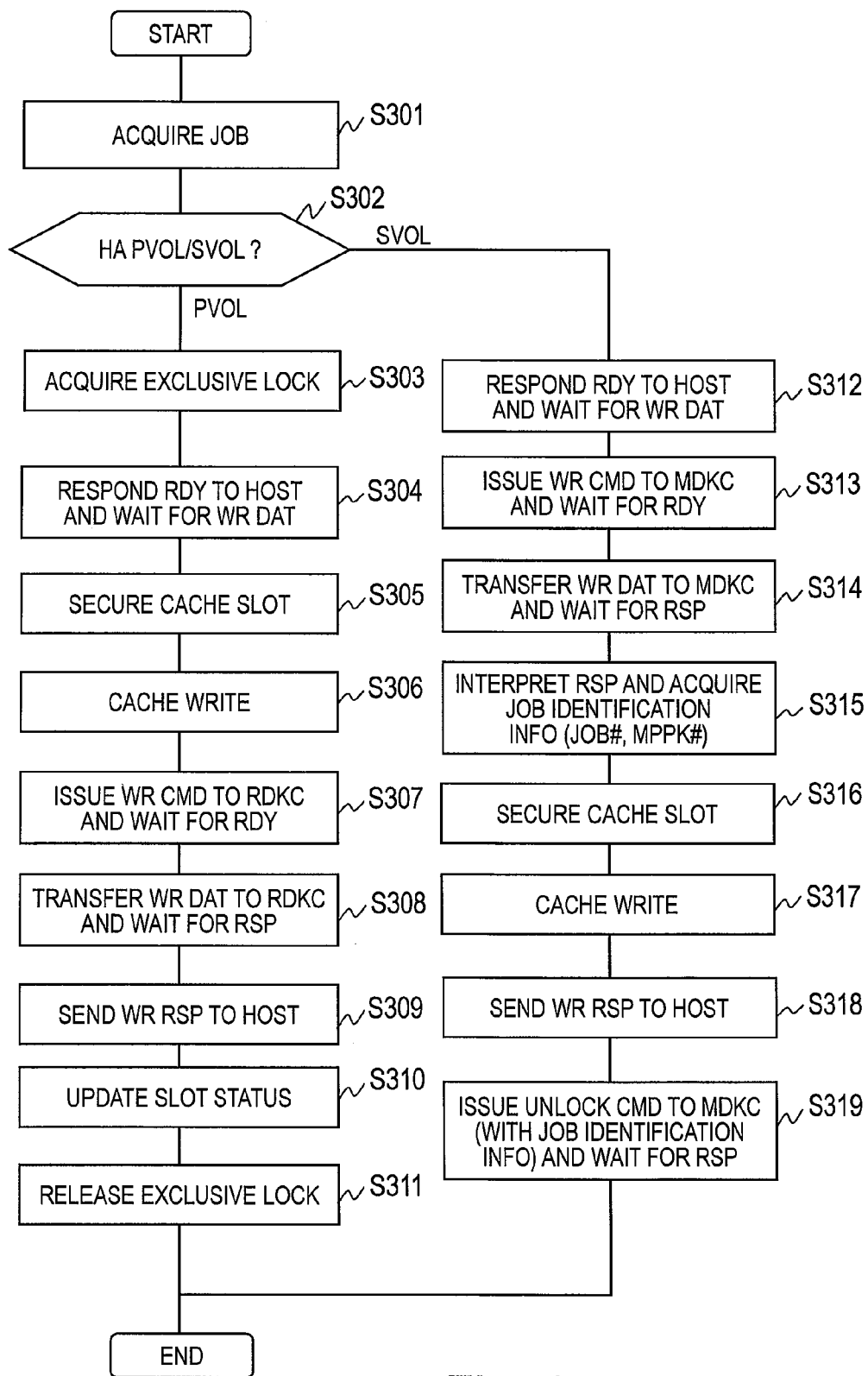
FIG. 17 illustrates a flowchart of processing of an MDKC and an RDKC responsive to a write command from a host computer.

FIG. 17 is a flowchart illustrating processing of the MDKC 10 and the RDKC 10R responsive to a write command from a host computer 180. In FIG. 17, the MDKC 10M performs Steps S301 to S311 and the RDKC 10R performs Steps 301, S302, and S312 to S319. In the example described below, writing to a volume corresponds to writing write data to a cache memory 131.

First, the processing of the MDKC 10M is described. The MDKC 10M receives a write command from the host computer 180. The write command designates a target volume with a LUN. The MDKC 10M determines the volume ID of the volume corresponding to the virtual volume designated by the write command with reference to the LU path management table 230.

The MDKC 10M acquires a job by creating a new entry in the job management table 260 (S301). Specifically, an MPPK 120 selects a free job in the job management table 260 and writes a process type (HOST WRITE) and information on the volume and address designated by the write command to the entry. The cell of the exclusion type column 267 remains blank. In the job management table 260 of FIG. 13, the entry of Job No. 1 represents a write from the host computer 180 to a PVOL.

The MPPK 120 determines whether the designated volume is a PVOL or an SVOL of an HA volume pair with reference to the HA volume pair management table 220 (S302). In this instance, the designated volume is a PVOL.

Next, the MPPK 120 acquires an exclusive lock for the new job (S303). Specifically, the MPPK 120 searches the job management table 260 for any other job which has acquired an exclusive lock on the designated volume and designated area. If an exclusive lock has been acquired, the MPPK 120 waits for the release of the exclusive lock. The order of acquiring exclusive locks is controlled with, for example, a not-shown queue. The unit of exclusive control may be LBA, like this example, or volume. Exclusively locking a part of the area of a volume can reduce its effect on the other command processing.

If no exclusive lock has been acquired on the designated volume and designated area by other job, the MPPK 120 sets an exclusive lock to the cell of the exclusion type column 267 of the new job. The process is a write to a PVOL and the exclusion type is R/W EXCLUSIVE.

Upon acquisition of an exclusive lock, the MPPK 120 returns a data transfer ready response to the host computer 180 and waits for the write data from the host computer 180 (S304). The MPPK 120 secures a cache slot for the write data (S305). Specifically, the MPPK 120 sets new data to a free slot in the cache slot management table 270. The MPPK 120 can identify the parity group corresponding to the designated volume with reference to the VOL management table 240.

The MPPK 120 writes the received write data to the secured cache slot with an FEPK 100 (S306). The MPPK 120 sets the slot status of the cache slot at DURING DUPLICATION in the cache slot management table 270.

The MPPK 120 issues a write command for a write to the SVOL paired with the PVOL to the RDKC 10R and waits for a data transfer ready response (S307). The MPPK 120 acquires the IDs of the SVOL and the RDKC 10R holding the SVOL from the HA volume management table 220. The MPPK 120 has instructed this RDKC 10R to write to the SVOL. The SVOL can be designated with a volume ID or a separately defined LUN.

Upon receipt of a ready response, the MPPK 120 transfers the write data received from the host computer 180 to the RDKC 10R with the FEPK 100 and waits for a write completion response (S308).

Upon receipt of a write completion response from the RDKC 10R, the MPPK 120 sends a write completion response to the host computer 180 (S309). Furthermore, the MPPK 120 changes the slot status of the cache slot to DIRTY in the cache slot management table 270 (S310). For example, the MPPK 120 acquires the target volume and area of the job from the job management table 260 to identify the cache slot with the cache slot management table 270.

The MPPK 120 updates the job management table 260 and releases the exclusive lock for the job (S311). For example, the MPPK 120 releases the exclusive lock by canceling the job in the job management table 260.

Next, processing of the RDKC 10R is described. Steps S301 and S402 performed by the RDKC 10R are substantially the same as Steps S401 and S402 performed by the MDKC 10M. However, the volume designated by the write command from the host computer 180 is an SVOL. In FIG. 13, the entry of Job No. 5 represents a write from the host computer 180 to an SVOL.

The MPPK 120 assigned the designated volume returns a data transfer ready response to the host computer 180 and waits for the write data from the host computer 180 (S312).

An FEPK 100 holds the write data received from the host computer 180 in the buffer 113. The MPPK 120 issues a write command for a write to the PVOL paired with the SVOL to the MDKC 10M and waits for a data transfer ready response (S313). The MPPK 120 acquires the IDs of the PVOL and the MDKC 10M holding the PVOL from the HA volume pair management table 220. The MPPK 120 has instructed the MDKC 10M to write to the PVOL. The PVOL can be designated with a volume ID or a separately defined LUN.

Upon receipt of a ready response, the MPPK 120 transfers the write data received from the host computer 180 to the MDKC 10M with the FEPK 100 and waits for a write completion response (S314).

The MPPK 120 interprets the write completion response received from the MDKC 10M and acquires job identification information (S315). The write completion response includes information identifying the job of this write. The job identification information includes the job number and the MPPK number in the MDKC 120 assigned the job. The MPPK 120 stores the job identification information in the column 268 of the entry of the job being executed.

The MPPK 120 secures a cache slot for the write data (S316). Specifically, the MPPK 120 sets new data to a free slot in the cache slot management table 270. The MPPK 120 can identify the parity group corresponding to the designated volume with reference to the VOL management table 240.

The MPPK 120 writes the write data stored in the buffer 113 to the secured cache slot (S317). The MPPK 120 sets the slot status of the cache slot at DIRTY in the cache slot management table 270.

After the cache write, the MPPK 120 sends a write completion response to the host computer 180 (S318). Furthermore, the MPPK 120 acquires job identification information from the job management table 260 and creates an exclusive lock release command including the job identification information. The MPPK 120 sends the created exclusive lock release command to the MDKC 10M and waits for a response from the MDKC 10M (S319).

Figure 18:
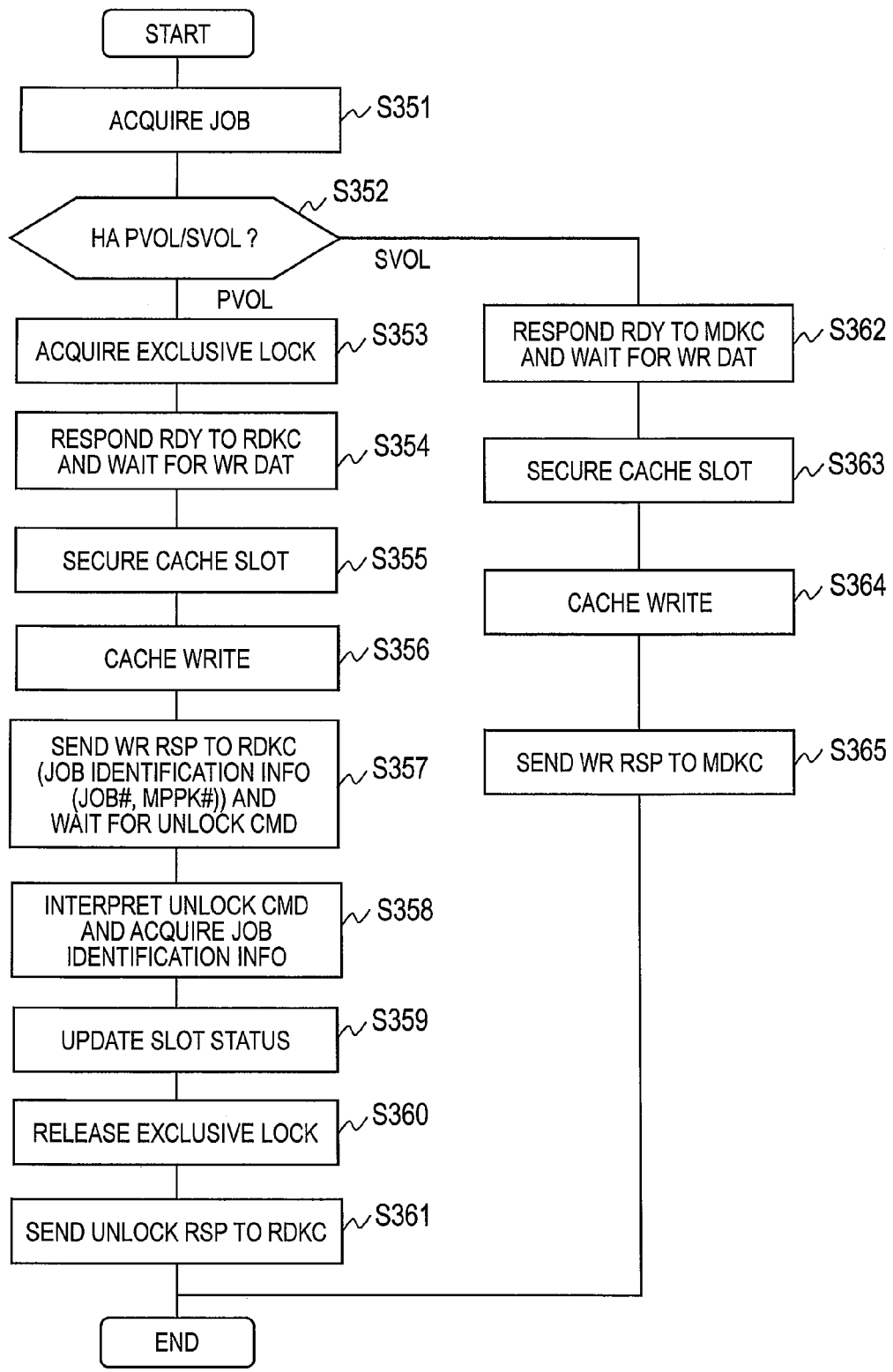
FIG. 18 illustrates a flowchart of processing of an MDKC and an RDKC responsive to a write command between the MDKC and the RDKC.

FIG. 18 is a flowchart illustrating processing of the MDKC 10M and the RDKC 10R responsive to a write command between the MDKC 10M and the RDKC 10R. In FIG. 18, the MDKC 10M performs Steps S351 to S361 and the RDKC 10R performs Steps S351, S352, and S362 to S365.

First, the processing of the MDKC 10M is described. The MDKC 10M receives a write command from the RDKC 10R. The write command designates a target volume with a volume ID or a separately defined LUN. The MDKC 10M acquires a job by creating a new entry in the job management table 260 (S351).

Specifically, the MPPK 120 assigned the designated volume selects a free job in the job management table 260 and writes a process type (INTER-DKC WRITE) and information on the volume and address designated by the write command to the entry. The cell of the exclusion type column 267 remains blank. In FIG. 13, the entry of Job No. 3 represents a process responsive to a write command for a write to a PVOL from the RDKC 10R.

The MPPK 120 determines whether the designated volume is a PVOL or an SVOL of an HA volume pair with reference to the HA volume pair management table 220 (S352). In this instance, the designated volume is a PVOL.

Next, the MPPK 120 acquires an exclusive lock for the new job (S353). Specifically, the MPPK 120 searches the job management table 260 for any other job which has acquired an exclusive lock on the designated volume and designated area. If an exclusive lock has been acquired, the MPPK 120 waits for the release of the exclusive lock. The order of acquiring exclusive locks is controlled with, for example, a not-shown queue.

If no exclusive lock has been acquired on the designated volume and designated area by other job, the MPPK 120 sets an exclusive lock to the cell of the exclusion type column 267 of the new job. The process is a write to a PVOL and the exclusion type is R/W EXCLUSIVE.

Upon acquisition of an exclusive lock, the MPPK 120 returns a data transfer ready response to the RDKC 10R and waits for the write data from RDKC 10R (S354). The MPPK 120 secures a cache slot for the write data (S355). Specifically, the MPPK 120 sets new data to a free slot in the cache slot management table 270. The MPPK 120 can identify the parity group corresponding to the designated volume with reference to the VOL management table 240.

The MPPK 120 writes the received write data to the secured cache slot with the FEPK 100 (S356). The MPPK 120 sets the slot status of the cache slot at DUPLICATING in the cache slot management table 270.

After writing the write data to the cache memory 130, the MPPK 120 returns a write completion response to the RDKC 10R and waits for an exclusive lock release command (S357). The write completion response includes job identification information on this write. The job can be identified with a job number and the number of the MPPK assigned the job. The MPPK 120 includes the job number acquired from the job management table 260 and its own MPPK number in the write completion response.

Upon receipt of an exclusive lock release command from the RDKC 10R, the MPPK 120 acquires the job identification information from the exclusive lock release command (S358). The MPPK 120 changes the slot status of the cache slot for the designated job to DIRTY (S359). For example, the MPPK 120 acquires the target volume and area of the job from the job management table 260 to identify the corresponding cache slot from the cache slot management table 270.

The MPPK 120 further releases the exclusive lock for the job indicated by the job identification information (S360). For example, the MPPK 120 cancels the job in the job management table 260 to release the exclusive lock. Thereafter, the MPPK 120 returns an exclusive lock release response to the RDKC 10R (S361).

Next, processing of the RDKC 10R is described. The RDKC 10R receives a write command from the MDKC 10M. The write command designates a target volume with a volume ID or a separately defined LUN. The RDKC 10R acquires a job by creating a new entry in the job management table 260 (S351). The specific method is the same as the method taken by the MDKC 10M.

An MPPK 120 determines whether the designated volume is a PVOL or an SVOL of an HA volume pair with reference to the HA volume pair management table 220 (S352). In this instance, the designated volume is an SVOL.

The MPPK 120 returns a data transfer ready to the MDKC 10M and waits for data transfer (S362). The MPPK 120 secures a cache slot for the write data (S363). Specifically, the MPPK 120 sets new data to a free slot in the cache slot management table 270. The MPPK 120 can identify the parity group corresponding to the designated volume with reference to the VOL management table 240.

The MPPK 120 writes write data to the secured cache slot with the FEPK 100 (S364). The MPPK 120 sets the slot status of the cache slot at DIRTY in the cache slot management table 270. After the cache write, the MPPK 120 sends a write completion response to the MDKC 10M (S365).

Figure 19:
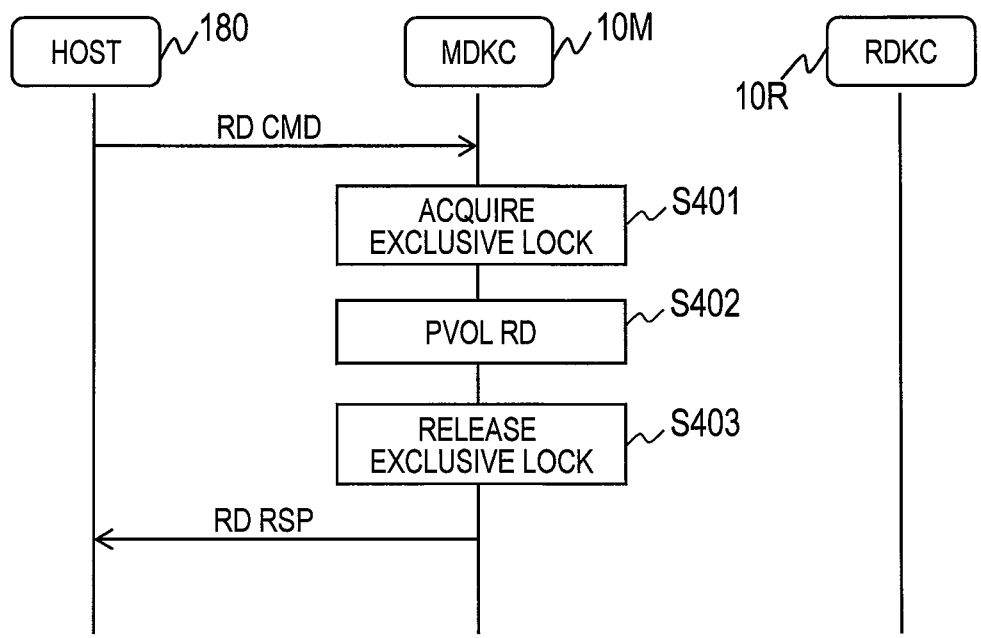
FIG. 19 illustrates a sequence of processing responsive to a read command for a PVOL from a host computer.

FIG. 19 illustrates a sequence of processing responsive to a read command for a PVOL from a host computer 180. The host computer 180 issues a read command (RD CMD) to read an area in a virtual volume to the MDKC 10M. The MDKC 10M acquires an exclusive lock on the area designated by the read command in the PVOL corresponding to the virtual volume (S401). The MDKC 10M reads data in the designated address area of the PVOL (S402). The MDKC 10M releases the exclusive lock (S403) and returns a read completion response (RD RSP) including the read data to the host computer 180.

Figure 20:
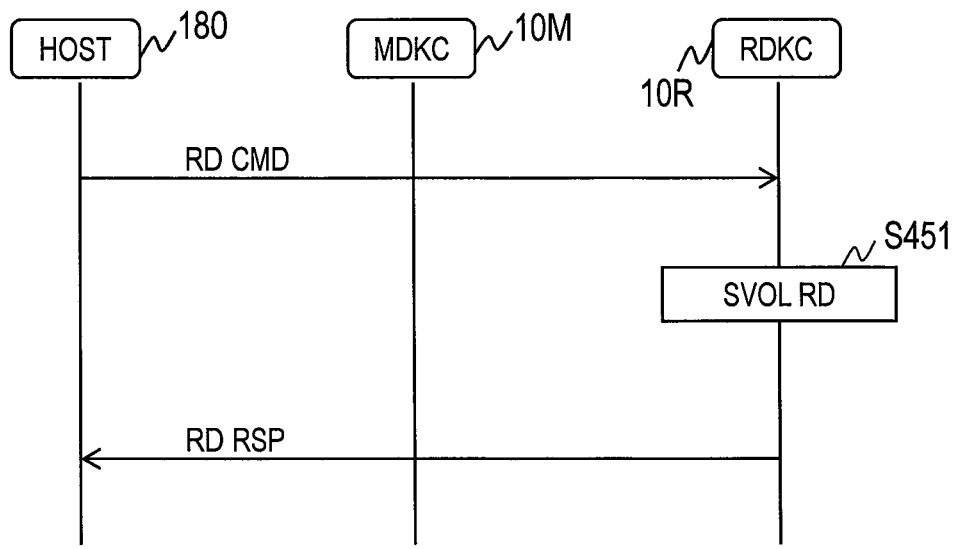
FIG. 20 illustrates a sequence of processing responsive to a read command for an SVOL from a host computer.

FIG. 20 illustrates a sequence of processing responsive to a read command for an SVOL from a host computer 180. The host computer 180 issues a read command (RD CMD) to read an area in a virtual volume to the RDKC 10R. The RDKC 10R reads data in the designated address area in the SVOL corresponding to the virtual volume (S451). The RDKC 10R returns a read completion response (RD RSP) including the read data to the host computer 180.

Figure 21:
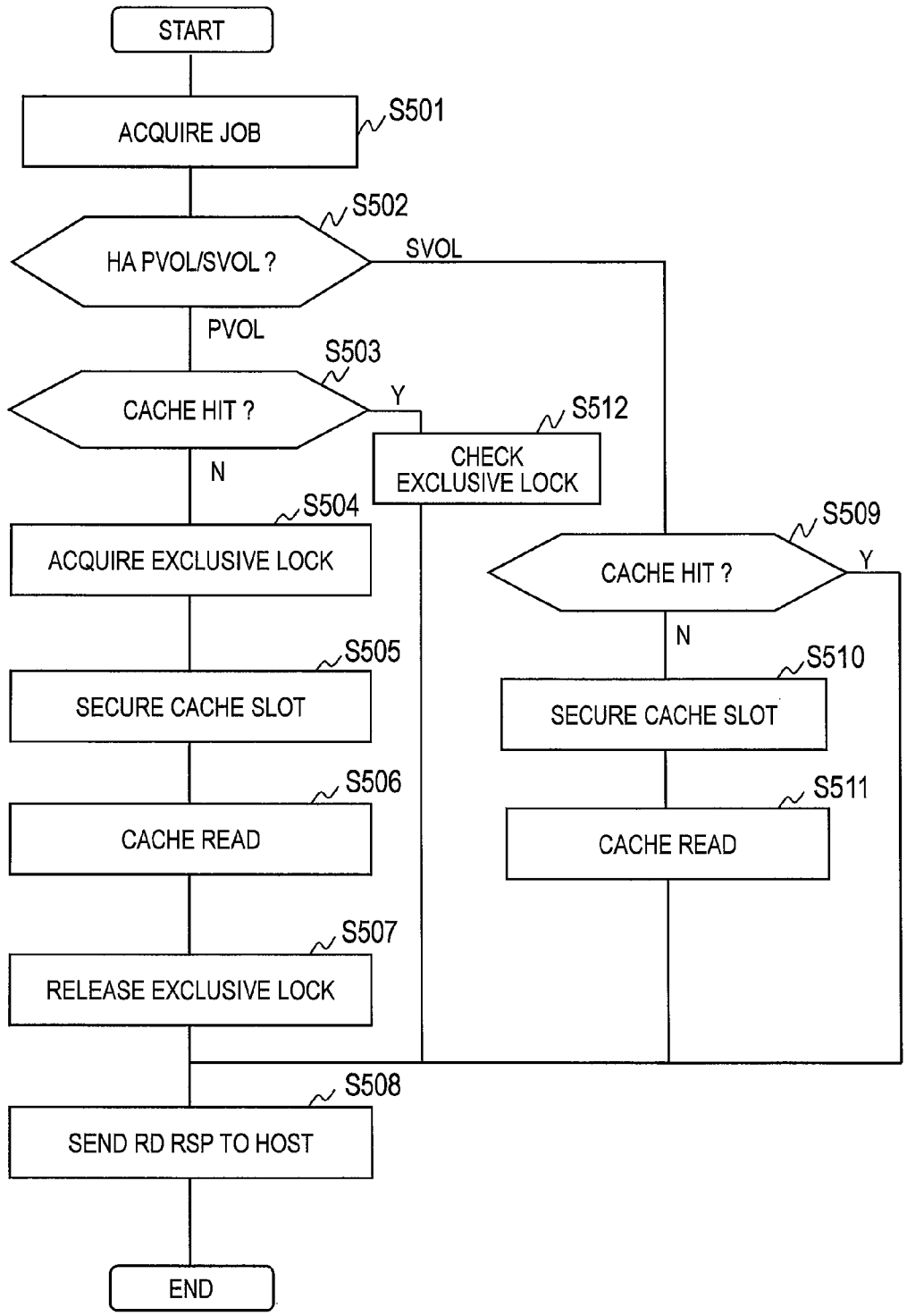
FIG. 21 illustrates a flowchart of processing of an MDKC10M and an RDKC1R responsive to a read command from a host computer.

FIG. 21 illustrates a flowchart of processing of the MDKC 10M and the RDKC 1R responsive to a read command from a host computer 180. In FIG. 21, the MDKC 10M performs Steps S501 to S508; the RDKC 10R performs Steps S501, S502, S509 to S511.

First, the read processing of the MDKC 10M is described. The MDKC 10M receives a read command from the host computer 180. The read command designates a target volume with a LUN. The MDKC 10M determines the volume ID of the volume corresponding to the virtual volume designated by the read command with reference to the LU path management table 230.

The MDKC 10M acquires a job by creating a new entry in the job management table 260 (S501). Specifically, the MPPK 120 assigned the designated volume selects a free job in the job management table 260 and writes the process type (HOST READ) and information on the volume and address designated by the read command to the entry of the job management table 260. The cell of the exclusion type column 267 remains blank. In FIG. 13, the entry of Job No. 0 represents a read from a PVOL in accordance with a command from the host computer 180.

The MPPK 120 determines whether the designated volume is a PVOL or an SVOL of an HA volume pair with reference to the HA volume pair management table 220 (S502). In this instance, the designated volume is a PVOL.

Next, the MPPK 120 determines whether the data in the storage area designated by the read command has been cached with reference to the cache slot management table 270 (S503). If the read data has been cached (S503: Y), the MPPK 120 checks whether an exclusive lock has been acquired for the job (S512).

Specifically, the MPPK 120 searches the job management table 260 for any other job which has acquired an R/W exclusion lock on the designated volume and designated area. If an R/W exclusion lock has been acquired, the MPPK 120 waits for the release of the R/W exclusion lock. If no R/W exclusion lock has been acquired on the designated volume and the designated area by other job, the MPPK 120 sends the read data in the cache to the host computer 180 (S508).

If the read data has not been cached (S503: N), the MPPK 120 acquires an exclusive lock for the job being executed (S503). Specifically, the MPPK 120 searches the job management table 260 for any other job which has acquired an R/W exclusion lock on the designated volume and designated area. If an R/W exclusion lock has been acquired, the MPPK 120 waits for the release of the R/W exclusion lock.

If no R/W exclusion lock has been acquired on the designated volume and designated area by other job, the MPPK 120 sets an exclusive lock to the cell of the exclusion type column 267 of the new job. The process is a read and the exclusion type is RD SHARED.

After acquiring an exclusive lock, the MPPK 120 secures a cache slot for the read data (S505). Specifically, the MPPK 120 sets new data to a free slot in the cache slot management table 270. The MPPK 120 can identify the parity group corresponding to the designated volume with reference to the VOL management table 240.

The MPPK 120 writes the write data read from the parity group to the secured cache slot (S506). The MPPK 120 sets the slot status of the cache slot at CLEAN in the cache slot management table 270. The MPPK 120 updates the job management table 260 and releases the exclusive lock for the job (S507). Thereafter, the MPPK 120 sends a read completion response including the read data to the host computer 180 (S508).

Next, processing of the RDKC 10R is described. Except for no acquisition of an exclusive lock for the job, the processing of the RDKC 10R is the same as that of the MDKC 10M. Steps S509, S510, and S511 correspond to Steps 503, S505, and S506, respectively. The RDKC 10R sends read data in the SVOL to the host computer 180.

In the foregoing examples, the HA volume pair is in the status of PAIR and is synchronized. FIG. 22 illustrates relations between pair statuses of an HA volume pair and exclusion types in I/O accesses to the PVOL and the SVOL. For the pair statuses, the status of PAIR and the status of PSUS (Pair SUSpend) are provided. In the status of PAIR, the PVOL and the SVOL are synchronized and an update of either one is reflected to the other.

In the status of PAIR, as described above, the PVOL receive write accesses and read accesses from host computers 180 and write accesses from the RDKC 10R. For these accesses, exclusive locking of RD SHARED or R/W EXCLUSIVE is performed. Likewise, the SVOL receives write accesses and read accesses from host computers 180 and write accesses from the MDKC 10M. For the accesses to the SVOL, exclusive locking is not performed.

In the status of PSUS, update of the SVOL is prohibited; the PVOL and the SVOL are not synchronized. The MDKC 10M processes accesses from host computers 180. The MDKC 10M accepts write accesses and read accesses from host computers 180 to the PVOL.

In processing a write command from a host computer 180, the MDKC 10M does not send a write command to the RDKC 10R. For the write accesses and read accesses from host computers 180, the MDKC 10M performs exclusive locking of R/W EXCLUSIVE and RD SHARED, respectively.

In the meanwhile, when the RDKC 10R in the status of PSUS receives a write command or a read command from a host computer 180, the RDKC 10R transfers the command to the MDKC 10M. At this time, the RDKC does not need to store the data in the cache memory 131; it stores data in the buffer 113 and then transfers the data to the MDKC 10M. In write processing, upon receipt of a write completion response from the MDKC 10M, the RDKC 10R returns a write completion response to the host computer 180. In read processing, the RDKC 10R receives read data from the MDKC 10M and sends it to the host computer 180.

Now, an example for coping with a failure occurring in an MPPK 120 is described. When a failure occurs in an MPPK 120 during processing a write command from a host computer 180, the PVOL and the SVOL may not be synchronized. This embodiment prevents performance degradation caused by the failure and further, unfailingly keeps the consistency within the HA volume pair, since a different MPPK 120 sends a write command for the SVOL in the RDKC 10R.

The sending of a write command for the SVOL can be performed by, for example, a different MPPK 120 (failure detector MPPK 120) that has detected the MPPK 120 (failed MPPK 120) that is failed and/or a different MPPK 120 (successor MPPK 120) that has taken over the PVOL from the failed MPPK 120.

As described above, when the slot status in the cache slot management table 270 is DUPLICATING, the MDKC 10M cannot distinguish whether the write data has been written to the SVOL. Accordingly, the MPPK 120 refers to the cache slot management table 270 to identify the jobs in need of sending a write command.

The failure detector MPPK 120 searches the cache slot management table 270 for entries including the PVOLs assigned to the failed MPPK 120 and indicating the slot statuses as DUPLICATING. These are entries in need of sending write commands to the SVOLs. The failure detector MPPK 120 changes the slot statuses of the detected entries into "SEND WRITE COMMAND".

For example, each successor MPPK 120 may perform the foregoing changes in the cache slot management table 270. The successor MPPK 120 updates only the entries including the PVOLs that it has taken over.

Figure 23:
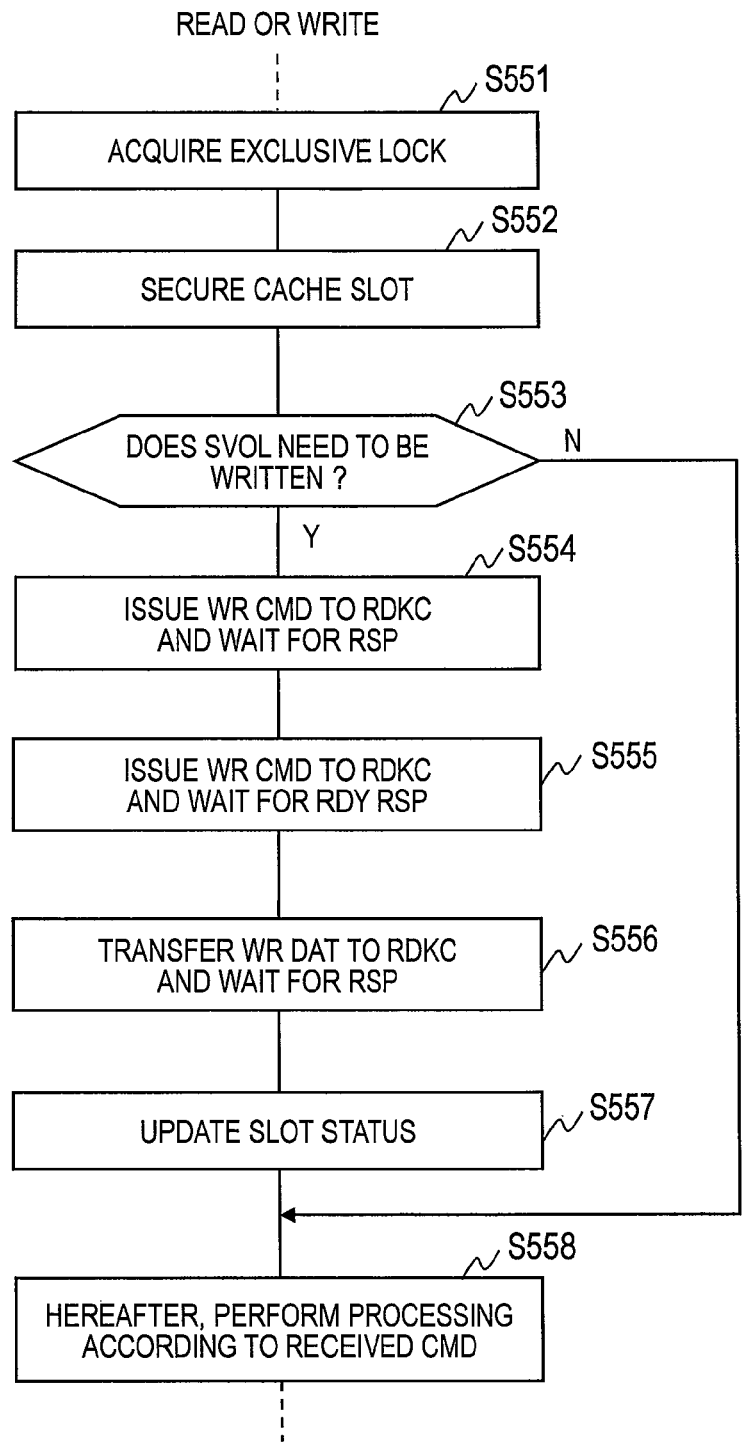
FIG. 23 is a flowchart of processing of a successor MPPK to send a write command for a write to an SVOL.

FIG. 23 is a flowchart of the processing of a successor MPPK 120 to send a write command for a write to an SVOL. FIG. 23 illustrates a part of the steps in the write processing to or read processing from a taken over PVOL, which is performed by the successor MPPK 120.

In this example of read/write processing from/to the PVOL taken over from a failed MPPK 120, the successor MPPK 120 sends a necessary write command to the SVOL. The write processing is host write processing or inter-DKC write processing.

As illustrated in FIG. 23, the successor MPPK 120 acquires an exclusive lock for the job corresponding to the command being processed (S551) and secures a cache slot (S552). The successor MPPK 120 searches the cache slot management table 270 for an entry in need of sending a write command to the SVOL (S553).

For example, the successor MPPK 120 searches for an entry including the PVOL and containing SEND WRITE COMMAND in the slot status. Alternatively, the MPPK 120 may search for an entry indicating the entirety or a part of the area designated by the command and containing SEND WRITE COMMAND in the slot status.

If an entry meeting the search conditions exists (S553: Y), the successor MPPK 120 issues a write command to the RDKC 10R and waits for a data transfer ready response (S554). Upon receipt of a ready response, the successor MPPK 120 transfers the write data held in the cache slot to the RDKC 10R and waits for a write completion response (S555).

Upon receipt of a write completion response from the RDKC 10R, the successor MPPK 120 changes the slot status of the cache slot in the cache slot management table 270 into DIRTY (S556). Thereafter, the successor MPPK 120 resumes the processing the command received from the host computer 180.

An MPPK 120 different from the successor MPPK 120, for example a failure detector MPPK 120, may send a necessary write command to the RDKC 10R with reference to the cache slot management table 270. The MPPK 120 sequentially selects entries indicating SEND WRITE COMMAND in the cache slot management table 270 and performs write processing to SVOLs. The both or only one of the failure detector MPPK 120 and the successor MPPK 120 may perform the write processing to the SVOLs.

Regarding the write processing to an SVOL, another method for the RDKC 10R to send an exclusive lock release command for a job to the MDKC 10M is described. In the above-described configuration example, the RDKC 10R sends an exclusive lock release command to the MDKC 10M separately from write data. In the example described hereinafter, the RDKC 10R sends an exclusive lock release command to the MDKC 10M together with write data. Consequently, the traffic can be reduced.

Figure 24:
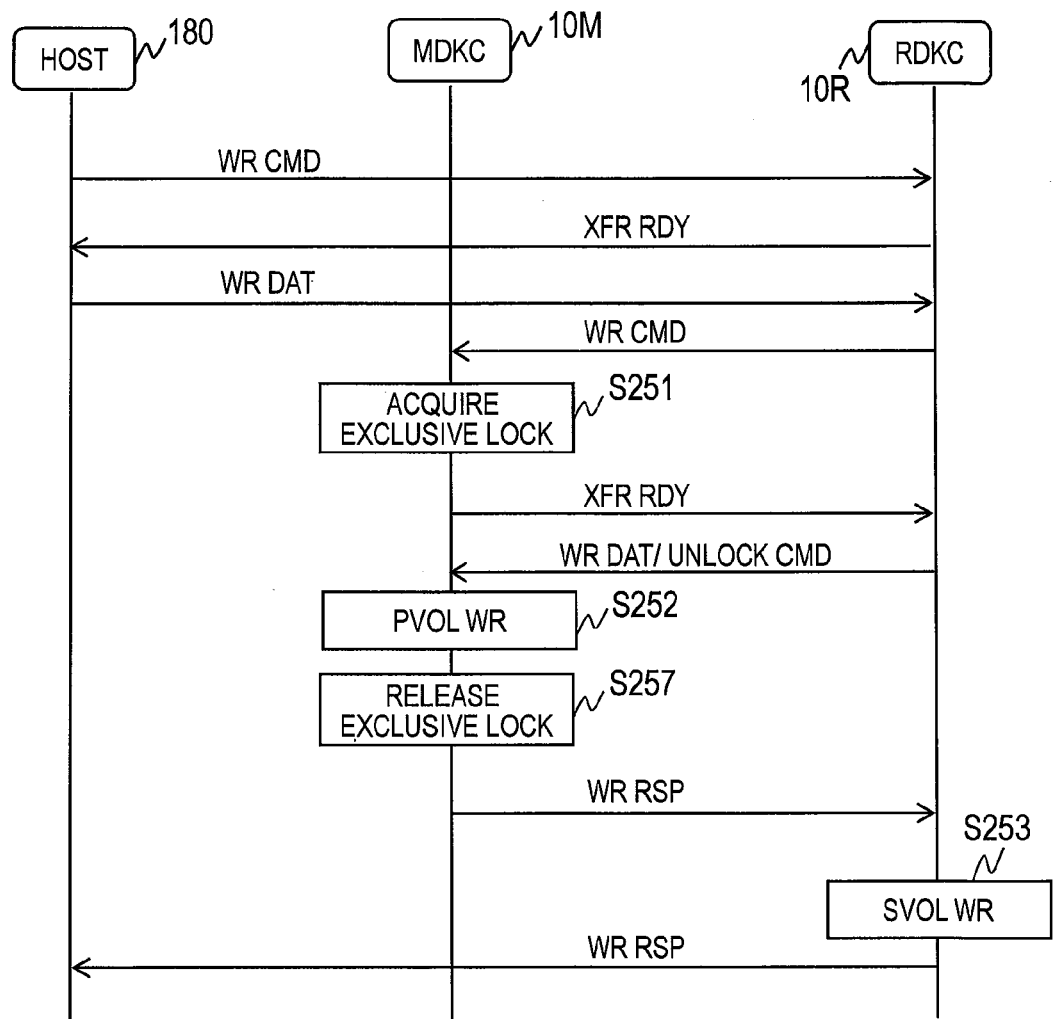
FIG. 24 illustrates a sequence of sending an exclusion lock release command together with write data.

FIG. 24 illustrates a sequence of sending an exclusive lock release command together with write data. In the following description, differences from the sequence diagram shown in FIG. 16 are mainly described. In FIG. 24, the MDKC 10M acquires an exclusive lock (S251) and returns a data transfer ready response (XFR RD) to the RDKC 10R.

The RDKC 10R sends an exclusive lock release command to the MDKC 10M together with the write data (WR DAT). Specifically, in the case of sending a plurality of parts of write data separately, the RDKC 10R sends the exclusive lock release command together in sending the last part.

The MDKC 10M receives the exclusive lock release command from the RDKC 10R together with the write data (WR DAT). The MDKC 10M writes the received write data to the designated area in the PVOL (S252). Upon completion of the data write to the area in the PVOL, the MDKC 10M releases the acquired exclusive lock (S257). Thereafter, the MDKC 10M returns a write completion response (WR RSP) to the RDKC 10R.

This sequence is effective on a configuration in which the FEPKs 100 do not have a function to automatically transfer a write command and write data. This sequence achieves reduction in frequency of communications between the MDKC 10M and the RDKC 10R.

In the foregoing configuration example, the RDKC 10R does not perform exclusive locking for a job. As will be described hereinafter, the RDKC 10R may perform exclusive locking for a job, like the MDKC 10M. As a result, higher reliability can be attained through solid sequence conservation.

Figure 25:
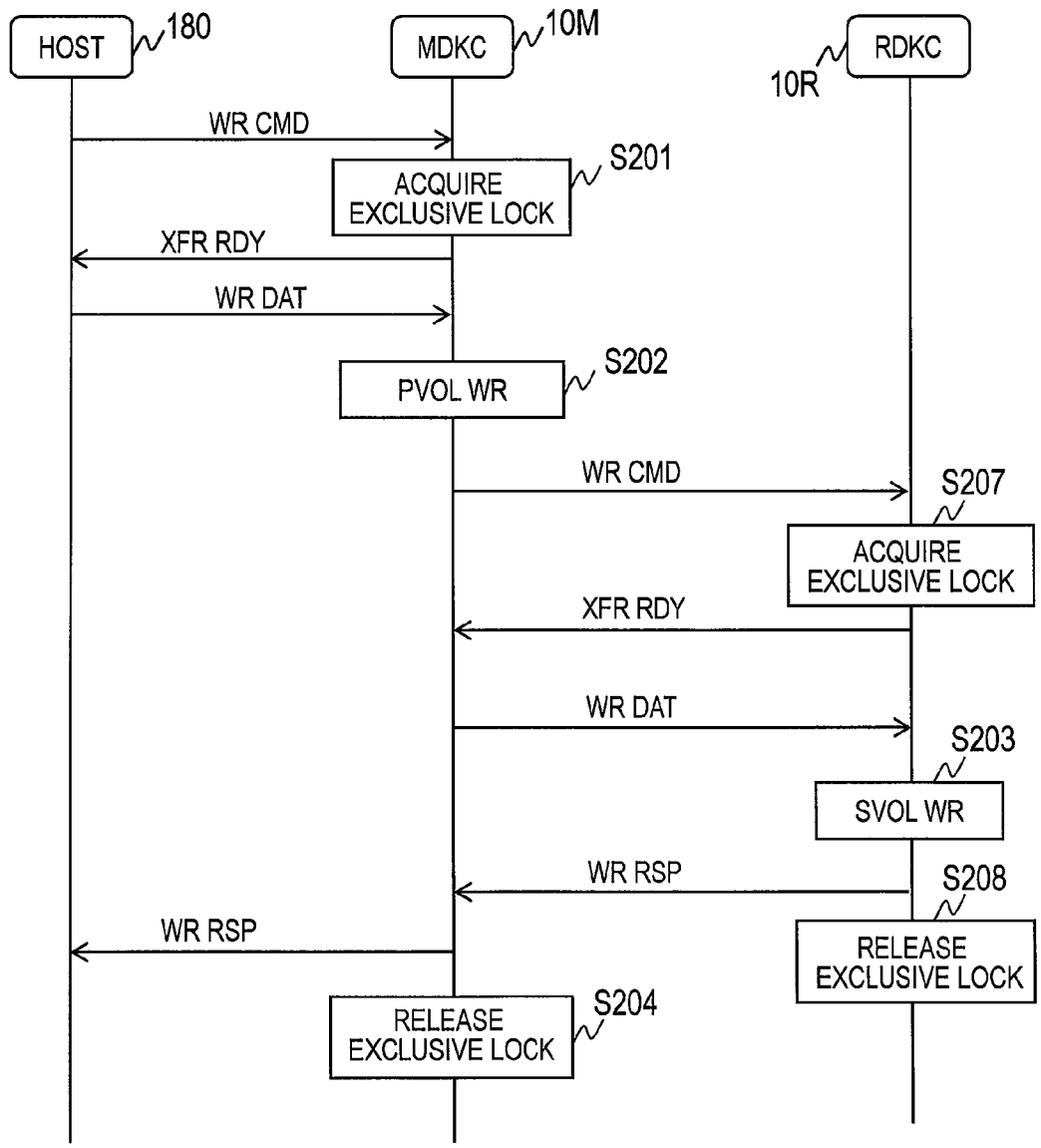
FIG. 25 illustrates a sequence of processing for a write from a host computer to a PVOL including exclusive locking for a job by an RDKC 10R.

FIG. 25 illustrates a sequence of processing for a write from a host computer 180 to a PVOL including exclusive locking for a job by the RDKC 10R. In the following description, differences from the sequence shown in FIG. 15 are mainly described.

Upon receipt of a write command (WR CMD) from the MDKC 10M, the RDKC 10R acquires an exclusive lock on the area designated by the write command (S207). The RDKC 10R returns a data transfer ready response (XFR RD) to the MDKC 10M and receives write data (WR DATA) from the MDKC 10M. The RDKC 10R writes the received write data to the address area in the SVOL (S203).

Upon completion of data write to the address area in the SVOL, the RDKC 10R returns a write completion response (WR RSP) to the MDKC 10M. Furthermore, the RDKC 10R releases the acquired exclusive lock (S209).

Figure 26:
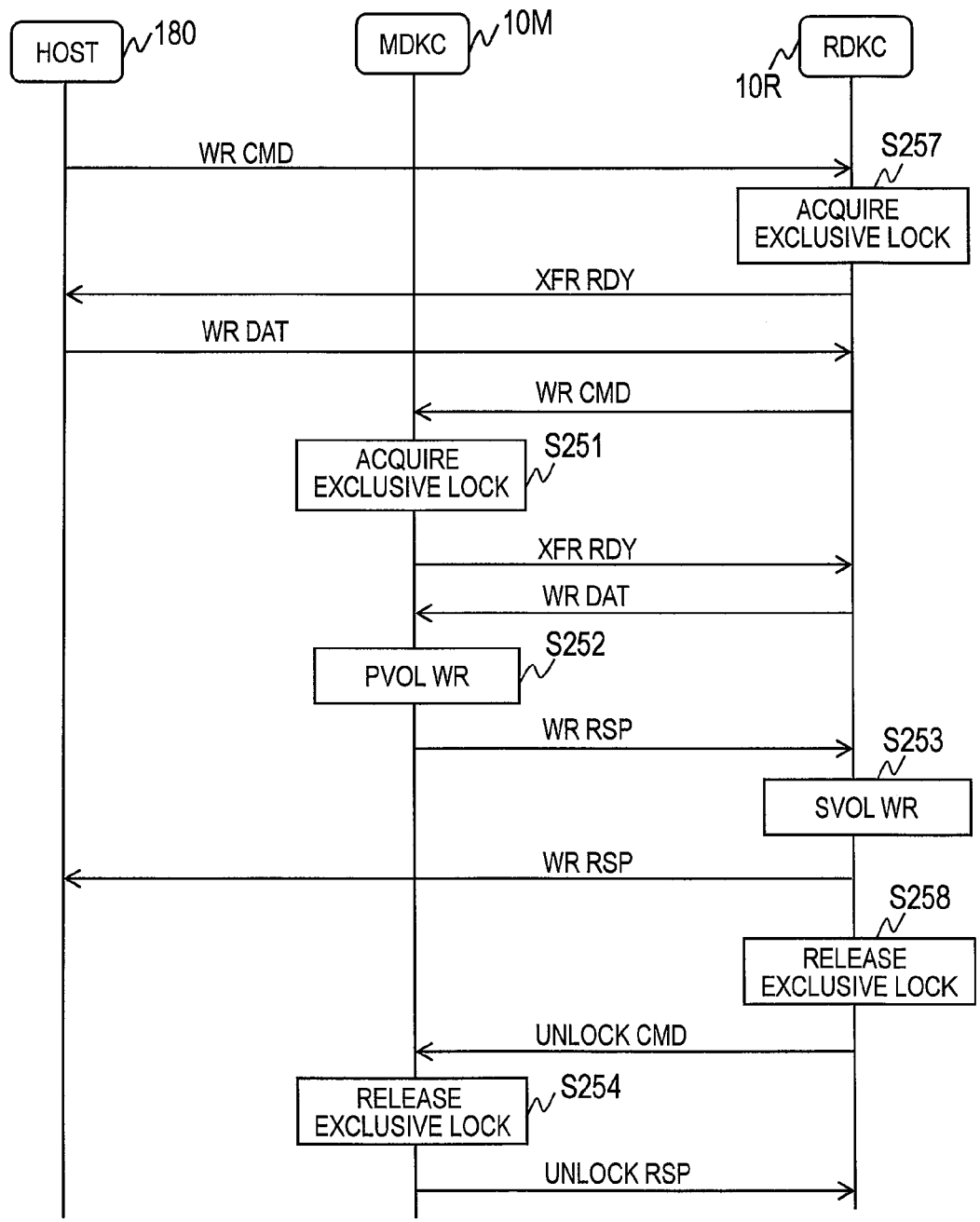
FIG. 26 illustrates a sequence of processing for a write from a host computer to an SVOL including exclusive locking for a job by an RDKC.

FIG. 26 illustrates a sequence of processing for a write from a host computer 180 to an SVOL including exclusive locking for a job by the RDKC 10R. In the following description, differences from the sequence shown in FIG. 16 are mainly described.

The host computer 180 issues a write command (WR CMD) for a write to an area in a virtual volume to the RDKC 10R. The RDKC 10R acquires an exclusive lock on the area designated by the write command in the SVOL corresponding to the virtual volume (S257).

The subsequent execution steps of the RDKC 10R until the step of writing the write data to the designated area in the SVOL (S253) are the same as those in the sequence diagram shown in FIG. 16. The RDKC 10R releases the acquired exclusive lock after returning a write completion response (WR RSP) to the host computer 180 (S258). Next, the RDKC 10R sends an exclusive lock release command designating a job to the MDKC 10M.

Figure 27:
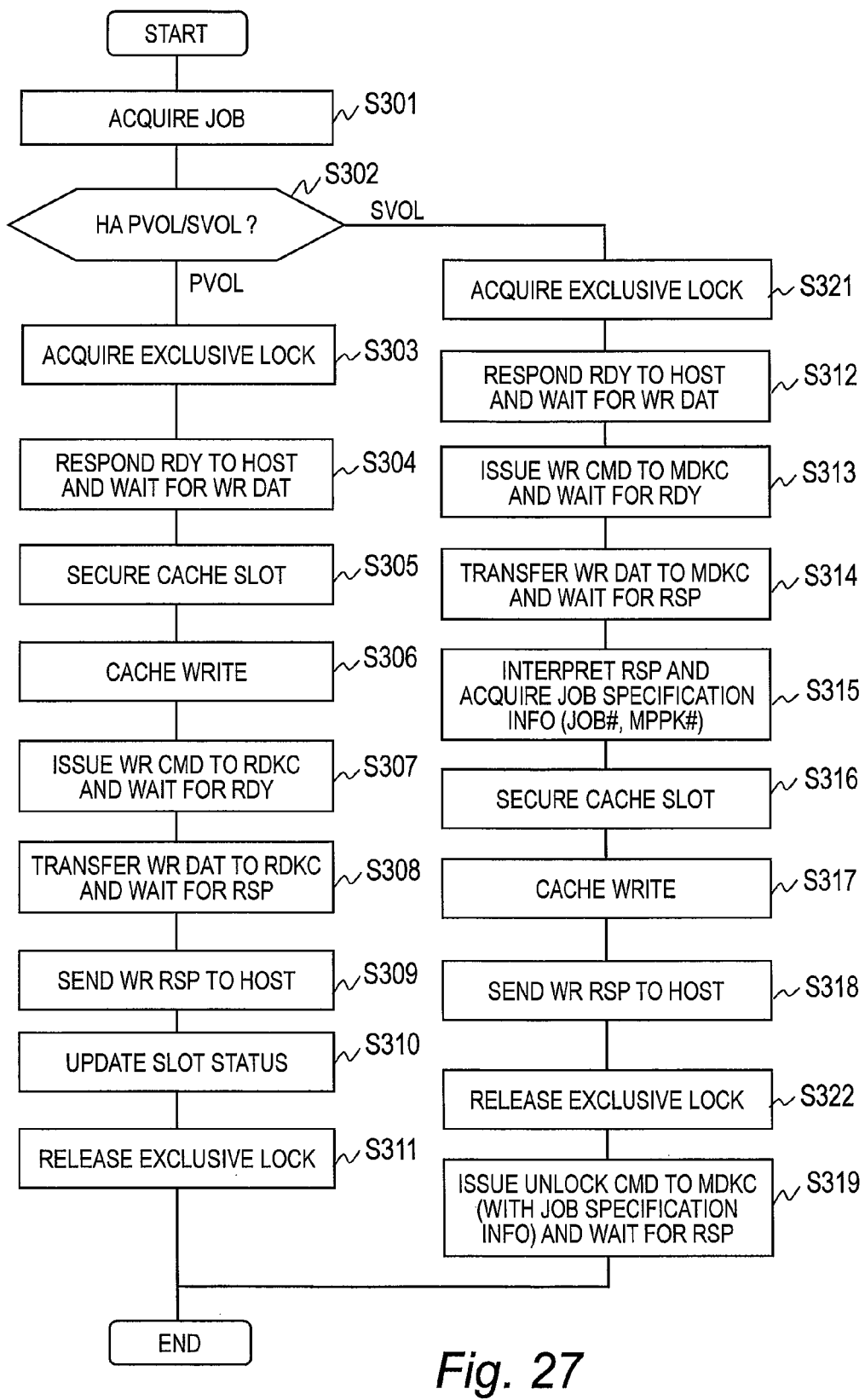
FIG. 27 illustrates a flowchart of processing of an MDKC and an RDKC responsive to a write command from a host computer that corresponds to the sequences of FIGS. 25 and 26.

FIG. 27 illustrates a flowchart of processing of the MDKC 10M and the RDKC 10R responsive to a write command from a host computer 180 that corresponds to the sequences of FIGS. 25 and 26. In the following description, differences from the flowchart shown in FIG. 17 are mainly described. The differences from the flowchart of FIG. 17 are that the RDKC 10R acquires an exclusive lock (S321) and releases the exclusive lock (S322).

Before returning a ready response to the host computer 180, the RDKC 10R acquires an exclusive lock for the new job at Step S321. The method of acquiring an exclusive lock is the same as that of the MDKC 10M at Step S303. The exclusion type is R/W EXCLUSIVE.

After returning a write completion response to the host computer 180, the RDKC 10R releases the exclusive lock at Step S322. The method of releasing the exclusive lock is the same as that of the MDKC 10M at Step S311.

Figure 28:
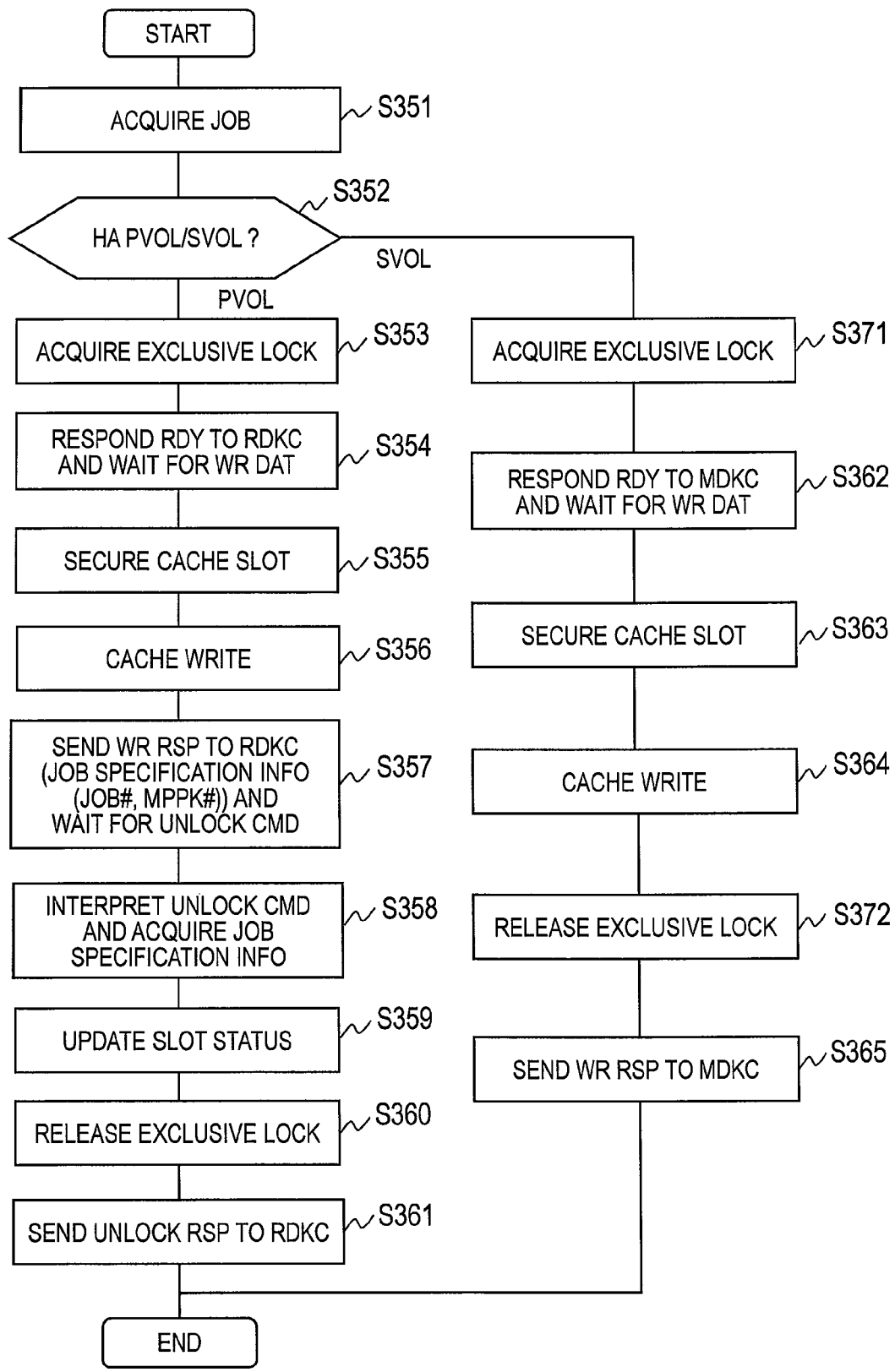
FIG. 28 illustrates a flowchart of processing of an MDKC and an RDKC responsive to a write command between the MDKC and the RDKC that corresponds to the sequences of FIGS. 25 and 26.

FIG. 28 illustrates a flowchart of processing of the MDKC 10M and the RDKC 10R responsive to a write command between the MDKC 10M and the RDKC 10R that corresponds to the sequences of FIGS. 25 and 26. In the following description, differences from the flowchart shown in FIG. 18 are mainly described. The differences from the flowchart of FIG. 18 are that the RDKC 10R acquires an exclusive lock (S371) and releases the exclusive lock (S372).

Before returning a ready response to the MDKC 10M, the RDKC 10R acquires an exclusive lock for the new job at Step S371. The method of acquiring an exclusive lock is the same as that of the MDKC 10M at Step S353. The exclusion type is R/W EXCLUSIVE.

After returning a write completion response to the MDKC 10M, the RDKC 10R releases the exclusive lock at Step S372. The method of releasing the exclusive lock is the same as that of the MDKC 10M at Step S360. The RDKC 10R may also perform exclusive locking in processing a read command from a host computer 180. In that case, the read processing of the RDKC 10R is the same as the read processing of the MDKC 10M including exclusive locking.

The job exclusion control by the RDKC on I/O accesses to SVOLs can increase the reliability.

It should be noted that this invention is not limited to the above-described embodiments but include various modifications. For example, the above-described embodiments have described details in order to describe this invention for better understanding; they are not limited to those including all the configurations that have been described. A part of the configuration of each embodiment may be replaced with a configuration of another embodiment or a configuration of an embodiment may be incorporated to a configuration of another embodiment. A part of the configuration of each embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

In this embodiment, the storage apparatuses virtualize the storage apparatuses and volumes; however, virtualization of the storage apparatuses and volumes may be achieved with a dedicated virtualization device or a function of the path manager for the hosts. The embodiments are applicable to a plurality of storage apparatuses having a plurality of redundantly (HA) configured active-active type of volumes.

What is claimed is:

1. A storage system comprising:
a first storage apparatus, including a first logical volume, coupled to a host computer; and
a second storage apparatus, including a second logical volume, coupled to the host computer and the first storage apparatus,
wherein the first logical volume and the second logical volume are operated as a high availability (HA) pair in which data in the first logical volume is duplicated in the second logical volume, a virtual storage identifier is associated with both the first storage apparatus and the second storage apparatus, and a virtual volume identifier is associated with both the first logical volume and the second logical volume, so that the first storage apparatus or the second storage apparatus is capable to receive an access request to a virtual volume identified by the virtual storage identifier and the virtual volume identifier,
wherein, when either the first storage apparatus or the second storage apparatus receives a write request to the virtual volume from the host computer, the storage system is configured to:
lock a storage area, regarding the write request, in the first logical volume of the HA pair for writing data in the virtual volume;
write data, regarding the write request, in the first logical volume and write data, regarding the write request in the second logical volume after completion of writing data in the first logical volume; and
release the lock of the storage area of the first logical volume after writing data in both the first logical volume and the second logical volume;
wherein, when the first storage apparatus receives a read request to the virtual volume from the host computer, the first storage apparatus is configured to:
determine whether a first storage area of the first logical volume regarding the read request is locked;
when the first storage area is locked, wait for release of the lock of the first storage area, read data regarding the read request from the first storage area of the first logical volume, and return a response to the host computer; and
when the first storage area is not locked, read data regarding the read request from the first storage area of the first logical volume, and return a response to the host computer; and
wherein, when the second storage apparatus receives a read request to the virtual volume from the host computer, the second storage apparatus is configured to:
read data regarding the read request from a second storage area of the second logical volume without determining whether the second storage area regarding the read request is locked, and return a response to the host computer.

2. The storage system according to claim 1,
wherein, when the second storage apparatus receives the write request to the virtual volume, the second storage apparatus is configured to:
send data regarding the write request to the first storage apparatus,
the first storage apparatus is configured to:
lock a storage area in the first logical volume regarding the write request;
write the data in the first logical volume; and
return a response to the second storage apparatus,
the second storage apparatus is configured to:
write the data in the second logical volume after receiving the response from the first storage apparatus; and
return an unlock command to the first storage apparatus, and return a response to the host computer, and
the first storage apparatus is configured to:
release the lock of the storage area of the first logical volume after receiving the unlock command from the second storage apparatus.

3. The storage system according to claim 2,
wherein the second storage apparatus comprises a buffer, and
wherein the second storage apparatus is configured to:
store write data regarding the write request in the buffer when the second storage apparatus receives the write request to the virtual volume; and
write the data from the buffer to the second logical volume after receiving the response from the first storage apparatus.

4. The storage system according to claim 1,
wherein, when the first storage apparatus receives the write request to the virtual volume, the first storage apparatus is configured to:
lock the storage area in the first logical volume regarding the write request;
write data regarding the write request in the first logical volume; and
send the data regarding the write request to the second storage apparatus,
the second storage apparatus is configured to:
write the data in the second logical volume; and
return a response to the first storage apparatus, and
the first storage apparatus is configured to:
return a response to the host computer after receiving the response from the second storage apparatus; and
release the lock of the storage area of the first logical volume.

5. The storage system according to claim 1,
wherein, when a failure occurs in the first storage apparatus, the second storage apparatus is configured to:
return a response regarding the access request to the virtual volume based on the data stored in the second logical volume.

6. The storage system according to claim 1,
wherein, when a failure occurs in the second logical volume, the second storage apparatus is configured to:
read data from the first storage apparatus when the second storage apparatus receives the read request to the virtual volume from the host computer; and
return a response to the host computer.

7. The storage system according to claim 1,
wherein the first storage apparatus comprises a first processor, a second processor, and a shared memory which is accessible from the both first processor and the second processor,
wherein control information is stored in the shared memory, the control information managing a duplicating storage area of the first logical volume where the write data has not been written in a corresponding storage area of the second logical volume,
wherein, when a failure occurs in the first processor which controls access to the first logical volume, the second processor is configured to:
refer to the control information;
find the duplicating storage area of the first logical volume;
send data stored in the duplicating storage area of the first logical volume to the second storage apparatus;
receive a response from the second storage apparatus; and
return a response to the host computer.

8. A method for controlling a storage system, the storage system including:
a first storage apparatus, including a first logical volume, coupled to a host computer; and
a second storage apparatus, including a second logical volume, coupled to the host computer and the first storage apparatus, the method comprising:
associating, when the first logical volume and the second logical volume operate as a high availability (HA) pair in which data in the first logical volume is duplicated in the second logical volume, a virtual storage identifier with both the first storage apparatus and the second storage apparatus and a virtual volume identifier with both the first logical volume and the second logical volume, so that the first storage apparatus or the second storage apparatus is capable to receive an access request to the virtual volume identified by the virtual storage identifier and the virtual volume identifier;
when either the first storage apparatus or the second storage apparatus receives a write request to the virtual volume from the host computer:
locking a storage area, regarding the write request, in the first logical volume of the HA pair for writing data in the virtual volume;
writing data, regarding the write request, in the first logical volume and writing data, regarding the write request in the second logical volume after completion of writing data in the first logical volume; and
releasing the lock of the storage area of the first logical volume after writing data in both the first logical volume and the second logical volume;
when the first storage apparatus receives a read request to the virtual volume from the host computer:
determining whether a first storage area regarding the read request is locked;
waiting, when the first storage area is locked, for release of the lock of the first storage area;
reading data regarding the read request from the first storage area of the first logical volume; and
returning a response to the host computer; and
when the second storage apparatus receives a read request to the virtual volume from the host computer, the method further comprising:
reading data regarding the read request from a second storage area of the second logical volume without determining whether the second storage area regarding the read request is locked; and
returning a response to the host computer.

9. The method according to claim 8, the method further comprising:
when the second storage apparatus receives the write request to the virtual volume:
sending data regarding the write request to the first storage apparatus;
locking a storage area in the first logical volume regarding the write request;
writing the data in the first logical volume;
returning a response to the second storage apparatus;
writing the data in the second logical volume after receiving the response from the first storage apparatus;
returning an unlock command to the first storage apparatus;
returning a response to the host computer after receiving the response from the second storage apparatus; and
releasing the lock of the storage area of the first logical volume after receiving the unlock command at the first storage apparatus.

10. The method according to claim 9,
wherein the second storage apparatus comprises buffer, and
the method further comprising:
storing write data regarding the write request in the buffer when the second storage apparatus receives the write request to the virtual volume; and
writing the data from the buffer to the second logical volume after receiving the response from the first storage apparatus.

11. The method according to claim 8, the method further comprising:
when the first storage apparatus receives the write request to the virtual volume:
locking the storage area in the first logical volume regarding the write request;
writing the data regarding the write request in the first logical volume;
sending the data regarding the write request to the second storage apparatus;

writing the data in the second logical volume;
returning a response to the first storage apparatus;
returning a response to the host computer after receiving the response at the first storage apparatus; and
releasing the lock of the storage area of the first logical volume.

12. The method according to claim 8, the method further comprising:
when a failure occurs in the first storage apparatus, returning a response regarding the access request to the virtual volume based on the data stored in the second logical volume.

13. The method according to claim 8, the method further comprising:
when a failure occurs in the second logical volume:
reading data from the first storage apparatus when the second storage apparatus receives the read request to the virtual volume from the host computer; and
returning a response to the host computer.

14. The method according to claim 8,
wherein the first storage apparatus includes a first processor and a second processor,
wherein control information is stored in the shared memory, the control information managing a duplicating storage area of the first logical volume where the write data has not been written in a corresponding storage area of the second logical volume,
the method further comprising:
when a failure occurs in the first processor which controls access to the first logical volume:
finding the duplicating storage area of the first logical volume by the second processor;
sending data stored in the duplicating storage area of the first logical volume to the second storage apparatus by the second processor;
receiving a response from the second storage apparatus by the second processor; and
returning a response to the host computer by the second processor.

* * * * *